United States Patent
Laucius et al.

(10) Patent No.: US 12,143,382 B1
(45) Date of Patent: *Nov. 12, 2024

(54) AUTHENTICATING A USER DEVICE ASSOCIATED WITH A USER TO COMMUNICATE VIA A WIRELESS NETWORK IN A SECURE WEB-BASED ENVIRONMENT

(71) Applicant: Gemini IP, LLC, New York, NY (US)

(72) Inventors: Andrew Laucius, Brooklyn, NY (US); Eric Winer, New York, NY (US); Ismail Cem Paya, Portland, OR (US)

(73) Assignee: Gemini IP, LLC, New York, NY (US)

( * ) Notice: Subject to any disclaimer, the term of this patent is extended or adjusted under 35 U.S.C. 154(b) by 324 days.

This patent is subject to a terminal disclaimer.

(21) Appl. No.: 17/689,667

(22) Filed: Mar. 8, 2022

Related U.S. Application Data

(63) Continuation of application No. 16/947,667, filed on Aug. 12, 2020, now Pat. No. 11,283,797, which is a
(Continued)

(51) Int. Cl.
*H04L 9/40* (2022.01)
*G06F 21/41* (2013.01)
(Continued)

(52) U.S. Cl.
CPC .......... *H04L 63/0884* (2013.01); *G06F 21/41* (2013.01); *G06F 21/64* (2013.01);
(Continued)

(58) Field of Classification Search
CPC ............. H04L 63/0884; H04L 63/0815; H04L 63/123; H04L 9/321; H04L 9/3242;
(Continued)

(56) References Cited

U.S. PATENT DOCUMENTS

| | | | |
|---|---|---|---|
| 4,790,431 A | 12/1988 | Reel et al. | |
| 5,216,715 A | 6/1993 | Markwitz | |

(Continued)

FOREIGN PATENT DOCUMENTS

| | | |
|---|---|---|
| CA | 2627540 A1 | 9/2009 |
| CA | 103927656 A | 7/2014 |

(Continued)

OTHER PUBLICATIONS

Bob Sullivan, 'Deadbeat bidders' dog eBay sellers, NBCNews.com (published Sep. 5, 2002), http://www.nbcnews.com/id/3078738/ns/technology_and_sciencetech_and_gadgets/t/deadbeat-bidders-dog-ebay-sellers/#.U4inz_IdXuS (last visted May 30, 2014).

(Continued)

*Primary Examiner* — Thaddeus J Plecha
(74) *Attorney, Agent, or Firm* — Lee & Hayes, P.C.

(57) ABSTRACT

Particular systems, methods, and program products for web-based security systems for user authentication and processing in a distributed computing environment are disclosed. A computing sub-system may receive an electronic processing request and a first signed data packet having a first payload that was hashed and encrypted using a first private key. The first payload may comprise first processing output and a first timestamp. The sub-system may verify the first signed data packet by decrypting it using a first public key. The sub-system may execute computing operations to satisfy the electronic processing request, producing second processing output. The sub-system may configure a data packet with a second payload comprising at least the second processing output and a second timestamp. The sub-system may encrypt the second payload using a second private key producing a second signed data packet. The sub-system may transmit to a second sub-system the second signed data packet.

20 Claims, 15 Drawing Sheets

Related U.S. Application Data continuation of application No. 16/589,679, filed on Oct. 1, 2019, now Pat. No. 10,778,682, which is a continuation of application No. 16/028,124, filed on Jul. 5, 2018, now Pat. No. 10,484,376, which is a continuation of application No. 15/906,898, filed on Feb. 27, 2018, now Pat. No. 10,063,548, which is a continuation of application No. 15/818,134, filed on Nov. 20, 2017, now Pat. No. 9,942,231, which is a continuation of application No. 15/006,971, filed on Jan. 26, 2016, now Pat. No. 9,853,977.

(60) Provisional application No. 62/107,726, filed on Jan. 26, 2015.

(51) Int. Cl.
*G06F 21/64* (2013.01)
*H04L 9/32* (2006.01)
*H04L 9/06* (2006.01)

(52) U.S. Cl.
CPC ............ *H04L 9/321* (2013.01); *H04L 9/3242* (2013.01); *H04L 9/3247* (2013.01); *H04L 63/0807* (2013.01); *H04L 63/0815* (2013.01); *H04L 63/123* (2013.01); *H04L 9/0637* (2013.01); *H04L 63/126* (2013.01)

(58) Field of Classification Search
CPC ..... H04L 9/3247; H04L 9/0637; G06F 21/41; G06F 21/64
See application file for complete search history.

(56) References Cited

U.S. PATENT DOCUMENTS

| | | |
|---|---|---|
| 5,319,710 A | 6/1994 | Atalla et al. |
| 5,642,420 A | 6/1997 | Kuroda et al. |
| 5,664,017 A | 9/1997 | Gressel et al. |
| 5,675,649 A | 10/1997 | Brennan et al. |
| 5,799,287 A | 8/1998 | Dembo |
| 5,852,665 A | 12/1998 | Gressel et al. |
| 5,950,176 A | 9/1999 | Keiser et al. |
| 5,995,625 A | 11/1999 | Sudia et al. |
| 6,021,257 A | 2/2000 | Chikauchi |
| 6,038,322 A | 3/2000 | Harkins |
| 6,157,920 A | 12/2000 | Jakobsson et al. |
| 6,505,174 B1 | 1/2003 | Keiser et al. |
| 6,523,012 B1 | 2/2003 | Glassman et al. |
| 6,583,712 B1 | 6/2003 | Reed et al. |
| 6,721,886 B1 | 4/2004 | Uskela |
| 6,804,357 B1 | 10/2004 | Ikonen et al. |
| 6,842,628 B1 | 1/2005 | Arnold et al. |
| 7,167,565 B2 | 1/2007 | Rajasekaran |
| 7,330,538 B2 | 2/2008 | Dunsmuir |
| 7,487,123 B1 | 2/2009 | Keiser et al. |
| 7,627,760 B2 | 12/2009 | Lauter et al. |
| 7,677,974 B2 | 3/2010 | Van Luchene |
| 7,716,484 B1 | 5/2010 | Kaliski, Jr. |
| 7,870,058 B2 | 1/2011 | Maltzman |
| 7,873,573 B2 | 1/2011 | Realini |
| 7,921,292 B1 | 4/2011 | Pauker et al. |
| 7,999,748 B2 | 8/2011 | Ligtenberg et al. |
| 8,108,278 B2 | 1/2012 | Tzekin et al. |
| 8,108,283 B2 | 1/2012 | Dimitri et al. |
| 8,127,142 B2 | 2/2012 | Cuppett |
| 8,139,770 B2 | 3/2012 | Zheng et al. |
| 8,224,702 B2 | 7/2012 | Mengerink et al. |
| 8,229,855 B2 | 7/2012 | Huang et al. |
| 8,229,859 B2 | 7/2012 | Samid |
| 8,239,330 B2 | 8/2012 | Montero et al. |
| 8,249,965 B2 | 8/2012 | Tumminaro |
| 8,255,297 B2 | 8/2012 | Morgenstern et al. |
| 8,275,692 B2 | 9/2012 | Cartledge et al. |
| 8,306,910 B2 | 11/2012 | Wilkes |
| 8,326,751 B2 | 12/2012 | Driemeyer et al. |
| 8,352,326 B2 | 1/2013 | Betzler et al. |
| 8,352,739 B2 | 1/2013 | Park et al. |
| 8,434,139 B1 | 4/2013 | Ortiz, Jr. |
| 8,452,703 B2 | 5/2013 | O'Leary et al. |
| 8,522,013 B2 | 8/2013 | Zhang et al. |
| 8,526,606 B2 | 9/2013 | Muthaiah |
| 8,555,067 B2 | 10/2013 | Schell et al. |
| 8,577,337 B2 | 11/2013 | O'Leary |
| 8,590,028 B2 | 11/2013 | Saxena et al. |
| 8,606,685 B2 | 12/2013 | Keiser et al. |
| 8,630,951 B2 | 1/2014 | Wilkes |
| 8,688,525 B2 | 4/2014 | Minde |
| 8,688,563 B2 | 4/2014 | Mehew et al. |
| 8,712,914 B2 | 4/2014 | Lyons et al. |
| 8,713,320 B2 | 4/2014 | Xu et al. |
| 8,719,131 B1 | 5/2014 | Roth et al. |
| 8,782,774 B1 | 7/2014 | Pahl et al. |
| 8,843,179 B2 | 9/2014 | Li et al. |
| 8,924,715 B2 | 12/2014 | Schell et al. |
| 8,948,386 B2 | 2/2015 | Campagna et al. |
| 8,965,366 B1 | 2/2015 | Somayajula et al. |
| 9,002,018 B2 | 4/2015 | Wilkins et al. |
| 9,020,479 B1 | 4/2015 | Somayajula et al. |
| 9,100,175 B2 | 8/2015 | Nix |
| 9,118,464 B2 | 8/2015 | Nix |
| 9,253,643 B2 | 2/2016 | Pattar et al. |
| 9,270,653 B2 | 2/2016 | Maria |
| 9,276,740 B2 | 3/2016 | Nix |
| 9,288,059 B2 | 3/2016 | Nix |
| 9,300,473 B2 | 3/2016 | Nix |
| 9,319,223 B2 | 4/2016 | Nix |
| 9,332,129 B2 | 5/2016 | Li et al. |
| 9,350,550 B2 | 5/2016 | Nix |
| 9,351,162 B2 | 5/2016 | Nix |
| D759,073 S | 6/2016 | Winklevoss |
| 9,408,012 B2 | 8/2016 | Li et al. |
| 9,596,078 B2 | 3/2017 | Nix |
| 9,628,981 B2 | 4/2017 | Park et al. |
| 9,641,327 B2 | 5/2017 | Nix |
| 9,674,690 B2 | 6/2017 | Lee et al. |
| 9,698,981 B2 | 7/2017 | Nix |
| 9,742,562 B2 | 8/2017 | Nix |
| 9,794,074 B2 | 10/2017 | Toll et al. |
| 9,794,775 B2 | 10/2017 | Huber et al. |
| 9,800,993 B2 | 10/2017 | Lee et al. |
| 9,807,605 B2 | 10/2017 | Gao et al. |
| 9,853,977 B1 | 12/2017 | Laucius et al. |
| 9,892,460 B1 | 2/2018 | Winklevoss et al. |
| 9,898,782 B1 | 2/2018 | Winklevoss et al. |
| 9,942,231 B1 | 4/2018 | Laucius et al. |
| 9,961,060 B2 | 5/2018 | Nix |
| 9,965,804 B1 | 5/2018 | Winklevoss et al. |
| 9,998,280 B2 | 6/2018 | Nix |
| 9,998,281 B2 | 6/2018 | Nix |
| 10,002,389 B1 | 6/2018 | Winklevoss et al. |
| 10,003,461 B2 | 6/2018 | Nix |
| 10,057,059 B2 | 8/2018 | Nix |
| 10,063,548 B1 | 8/2018 | Laucius et al. |
| 10,068,228 B1 | 9/2018 | Winklevoss et al. |
| 10,084,768 B2 | 9/2018 | Nix |
| 10,158,480 B1 | 12/2018 | Winklevoss et al. |
| 10,255,635 B1 | 4/2019 | Winklevoss et al. |
| 10,269,009 B1 | 4/2019 | Winklevoss et al. |
| 10,325,257 B1 | 6/2019 | Winklevoss et al. |
| 10,354,325 B1 | 7/2019 | Skala et al. |
| 10,373,129 B1 | 8/2019 | James et al. |
| 10,373,158 B1 | 8/2019 | James et al. |
| 10,438,290 B1 | 10/2019 | Winklevoss et al. |
| 10,484,376 B1 * | 11/2019 | Laucius ............... H04L 9/3247 |
| 10,540,640 B1 | 1/2020 | James et al. |
| 10,540,653 B1 | 1/2020 | James et al. |
| 10,540,654 B1 | 1/2020 | James et al. |
| 10,650,376 B1 | 5/2020 | Winklevoss et al. |
| 10,693,632 B1 | 6/2020 | Winklevoss et al. |
| 10,778,682 B1 * | 9/2020 | Laucius ............... H04L 63/123 |
| 10,915,891 B1 | 2/2021 | Winklevoss et al. |
| 10,929,842 B1 | 2/2021 | Arvanaghi et al. |
| 10,929,929 B1 | 2/2021 | Winklevoss et al. |

(56) References Cited

U.S. PATENT DOCUMENTS

| | | |
|---|---|---|
| 10,984,470 B1 | 4/2021 | Winklevoss et al. |
| 10,984,472 B1 | 4/2021 | Winklevoss et al. |
| 11,017,381 B1 | 5/2021 | Winklevoss et al. |
| 11,017,391 B1 | 5/2021 | Winklevoss et al. |
| 11,087,313 B1 | 8/2021 | Winklevoss et al. |
| 11,139,955 B1 | 10/2021 | So et al. |
| 11,283,797 B2 * | 3/2022 | Laucius ............ H04L 63/0884 |
| 2001/0029581 A1 | 10/2001 | Knauft |
| 2002/0018569 A1 | 2/2002 | Panjwani et al. |
| 2002/0143614 A1 | 10/2002 | MacLean et al. |
| 2002/0171546 A1 | 11/2002 | Evans et al. |
| 2003/0003895 A1 | 1/2003 | Wallentin et al. |
| 2003/0009413 A1 | 1/2003 | Furbush et al. |
| 2003/0014749 A1 | 1/2003 | Simons et al. |
| 2003/0211842 A1 | 11/2003 | Kempf et al. |
| 2003/0225672 A1 | 12/2003 | Hughes, Jr. et al. |
| 2004/0049464 A1 | 3/2004 | Ohmori et al. |
| 2004/0098609 A1 * | 5/2004 | Bracewell ............ H04L 63/068 |
| | | 726/6 |
| 2004/0143710 A1 | 7/2004 | Walmsley |
| 2004/0162472 A1 | 8/2004 | Berson et al. |
| 2004/0179684 A1 | 9/2004 | Appenzeller et al. |
| 2004/0193657 A1 | 9/2004 | Saito et al. |
| 2004/0221163 A1 | 11/2004 | Jorgensen et al. |
| 2004/0243488 A1 | 12/2004 | Yamamoto et al. |
| 2004/0260949 A1 * | 12/2004 | Aoki ....................... H04L 63/08 |
| | | 726/8 |
| 2005/0008159 A1 | 1/2005 | Grilli et al. |
| 2005/0021875 A1 | 1/2005 | Bouthemy et al. |
| 2005/0044022 A1 | 2/2005 | Spirgel et al. |
| 2005/0050323 A1 | 3/2005 | Mizrah |
| 2005/0120202 A1 | 6/2005 | Cuellar et al. |
| 2005/0138353 A1 | 6/2005 | Spies et al. |
| 2005/0193199 A1 | 9/2005 | Asokan et al. |
| 2005/0240510 A1 | 10/2005 | Schweickert et al. |
| 2005/0246282 A1 | 11/2005 | Naslund et al. |
| 2005/0278787 A1 | 12/2005 | Naslund et al. |
| 2006/0021063 A1 | 1/2006 | Hori |
| 2006/0056355 A1 | 3/2006 | Love et al. |
| 2006/0059344 A1 | 3/2006 | Mononen |
| 2006/0095771 A1 | 5/2006 | Appenzeller et al. |
| 2006/0206710 A1 | 9/2006 | Gehrmann |
| 2006/0218625 A1 | 9/2006 | Pearson et al. |
| 2006/0281442 A1 | 12/2006 | Lee et al. |
| 2007/0033403 A1 | 2/2007 | Lauter et al. |
| 2007/0101400 A1 | 5/2007 | Freeman et al. |
| 2007/0117615 A1 | 5/2007 | Van Luchene |
| 2007/0146797 A1 | 6/2007 | Sakai et al. |
| 2007/0158439 A1 | 7/2007 | Conner et al. |
| 2007/0206799 A1 | 9/2007 | Wingert et al. |
| 2007/0219869 A1 | 9/2007 | Haines et al. |
| 2007/0271455 A1 | 11/2007 | Nakano et al. |
| 2008/0016230 A1 | 1/2008 | Holtmanns et al. |
| 2008/0022089 A1 | 1/2008 | Leedom |
| 2008/0031204 A1 | 2/2008 | Sood |
| 2008/0109280 A1 | 5/2008 | Csoka |
| 2008/0114978 A1 | 5/2008 | Lehtovirta et al. |
| 2008/0120221 A1 | 5/2008 | Toneguzzo |
| 2008/0130879 A1 | 6/2008 | Heinonen et al. |
| 2008/0140578 A1 | 6/2008 | Felt et al. |
| 2008/0159318 A1 | 7/2008 | Pierlot et al. |
| 2008/0165698 A1 | 7/2008 | Dalsgaard et al. |
| 2008/0167965 A1 | 7/2008 | Von Nothaus et al. |
| 2008/0215474 A1 | 9/2008 | Graham |
| 2008/0243703 A1 | 10/2008 | Al-Herz et al. |
| 2008/0249957 A1 | 10/2008 | Masuyama et al. |
| 2008/0281444 A1 | 11/2008 | Krieger et al. |
| 2008/0307218 A1 | 12/2008 | Logvinov |
| 2009/0011320 A1 | 1/2009 | Senda |
| 2009/0028341 A1 | 1/2009 | Hamachi |
| 2009/0041110 A1 | 2/2009 | Malladi |
| 2009/0060197 A1 | 3/2009 | Taylor et al. |
| 2009/0077643 A1 | 3/2009 | Schmidt et al. |
| 2009/0089168 A1 | 4/2009 | Schneck |
| 2009/0094134 A1 | 4/2009 | Toomer et al. |
| 2009/0098939 A1 | 4/2009 | Hamilton, II et al. |
| 2009/0113203 A1 | 4/2009 | Tsuge et al. |
| 2009/0116642 A1 | 5/2009 | Yang et al. |
| 2009/0119200 A1 | 5/2009 | Riviere |
| 2009/0125996 A1 | 5/2009 | Guccione et al. |
| 2009/0132806 A1 | 5/2009 | Blommaert et al. |
| 2009/0132830 A1 | 5/2009 | Haga et al. |
| 2009/0183541 A1 | 7/2009 | Sadighi et al. |
| 2009/0191857 A1 | 7/2009 | Horn et al. |
| 2009/0217348 A1 | 8/2009 | Salmela et al. |
| 2009/0265268 A1 | 10/2009 | Huang et al. |
| 2009/0268909 A1 | 10/2009 | Girao et al. |
| 2009/0274306 A1 | 11/2009 | Nolte |
| 2009/0282246 A1 | 11/2009 | Gunther |
| 2009/0313472 A1 | 12/2009 | Guccione et al. |
| 2010/0023771 A1 | 1/2010 | Struik |
| 2010/0031042 A1 | 2/2010 | Di Crescenzo et al. |
| 2010/0062808 A1 | 3/2010 | Cha et al. |
| 2010/0094771 A1 | 4/2010 | VanderPal |
| 2010/0098253 A1 | 4/2010 | Delerablee |
| 2010/0146290 A1 | 6/2010 | Bachmann et al. |
| 2010/0166167 A1 | 7/2010 | Karimi-Cherkandi et al. |
| 2010/0195833 A1 | 8/2010 | Priestley et al. |
| 2010/0199334 A1 | 8/2010 | Ehrensvard et al. |
| 2010/0211779 A1 | 8/2010 | Sundaram |
| 2010/0223461 A1 | 9/2010 | Drader et al. |
| 2010/0228674 A1 | 9/2010 | Ogg et al. |
| 2010/0275028 A1 | 10/2010 | Takashima |
| 2010/0306084 A1 | 12/2010 | Ciptawilangga |
| 2011/0016321 A1 | 1/2011 | Sundaram et al. |
| 2011/0035584 A1 | 2/2011 | Meyerstein et al. |
| 2011/0055553 A1 | 3/2011 | Lee et al. |
| 2011/0110516 A1 | 5/2011 | Satoh |
| 2011/0112662 A1 | 5/2011 | Thompson et al. |
| 2011/0158411 A1 | 6/2011 | Medvinsky et al. |
| 2011/0167272 A1 | 7/2011 | Kolesnikov |
| 2011/0213959 A1 | 9/2011 | Bodi et al. |
| 2011/0231913 A1 | 9/2011 | Feng et al. |
| 2011/0237281 A1 | 9/2011 | Busropan et al. |
| 2011/0268022 A1 | 11/2011 | Xu |
| 2011/0269422 A1 | 11/2011 | Xu et al. |
| 2011/0269461 A1 | 11/2011 | Xu et al. |
| 2011/0269472 A1 | 11/2011 | Xu et al. |
| 2011/0270747 A1 | 11/2011 | Xu |
| 2011/0270748 A1 | 11/2011 | Graham, III et al. |
| 2011/0291803 A1 | 12/2011 | Bajic et al. |
| 2011/0302412 A1 | 12/2011 | Deng et al. |
| 2011/0314287 A1 | 12/2011 | Escott et al. |
| 2012/0011360 A1 | 1/2012 | Engels et al. |
| 2012/0023336 A1 | 1/2012 | Natarajan |
| 2012/0030461 A1 | 2/2012 | Willey et al. |
| 2012/0033613 A1 | 2/2012 | Lin et al. |
| 2012/0072732 A1 | 3/2012 | Canard et al. |
| 2012/0084568 A1 | 4/2012 | Sarikaya et al. |
| 2012/0089568 A1 | 4/2012 | Manley et al. |
| 2012/0101886 A1 | 4/2012 | Subramanian et al. |
| 2012/0108205 A1 | 5/2012 | Schell et al. |
| 2012/0117635 A1 | 5/2012 | Schell et al. |
| 2012/0123924 A1 | 5/2012 | Rose et al. |
| 2012/0159153 A1 | 6/2012 | Shim et al. |
| 2012/0170451 A1 | 7/2012 | Viswanathan et al. |
| 2012/0185395 A1 | 7/2012 | Wilkes |
| 2012/0190354 A1 | 7/2012 | Merrien et al. |
| 2012/0214444 A1 | 8/2012 | McBride et al. |
| 2012/0239543 A1 | 9/2012 | Ryan |
| 2012/0260086 A1 | 10/2012 | Haggerty et al. |
| 2012/0260090 A1 | 10/2012 | Von Hauck et al. |
| 2012/0260095 A1 | 10/2012 | Von Hauck et al. |
| 2012/0272064 A1 | 10/2012 | Sundaram et al. |
| 2012/0278200 A1 | 11/2012 | van Coppenolle et al. |
| 2012/0278490 A1 | 11/2012 | Sennett et al. |
| 2012/0300932 A1 | 11/2012 | Cambridge et al. |
| 2012/0331287 A1 | 12/2012 | Bowman et al. |
| 2012/0331292 A1 | 12/2012 | Haggerty et al. |
| 2012/0331298 A1 | 12/2012 | Xu et al. |
| 2013/0007442 A1 | 1/2013 | Mao et al. |
| 2013/0012168 A1 | 1/2013 | Rajadurai et al. |
| 2013/0028184 A1 | 1/2013 | Lee et al. |
| 2013/0036373 A1 | 2/2013 | Alderfer et al. |

(56) References Cited

U.S. PATENT DOCUMENTS

| | | |
|---|---|---|
| 2013/0041773 A1 | 2/2013 | Muse |
| 2013/0054471 A1 | 2/2013 | Samid |
| 2013/0061049 A1 | 3/2013 | Irvine |
| 2013/0091556 A1 | 4/2013 | Horn et al. |
| 2013/0114810 A1 | 5/2013 | Kobayashi et al. |
| 2013/0117824 A1 | 5/2013 | Naslund et al. |
| 2013/0122864 A1 | 5/2013 | Haggerty et al. |
| 2013/0145151 A1 | 6/2013 | Brown et al. |
| 2013/0157673 A1 | 6/2013 | Brusilovsky |
| 2013/0159699 A1 | 6/2013 | Torkkel |
| 2013/0165073 A1 | 6/2013 | Madsen |
| 2013/0166455 A1 | 6/2013 | Feigelson |
| 2013/0173747 A1 | 7/2013 | Kim et al. |
| 2013/0173926 A1 | 7/2013 | Morese et al. |
| 2013/0179962 A1 | 7/2013 | Arai et al. |
| 2013/0182586 A1 | 7/2013 | Paladugu et al. |
| 2013/0183932 A1 | 7/2013 | Lemilainen et al. |
| 2013/0191277 A1 | 7/2013 | O'Leary et al. |
| 2013/0212637 A1 | 8/2013 | Guccione et al. |
| 2013/0227646 A1 | 8/2013 | Haggerty et al. |
| 2013/0231087 A1 | 9/2013 | O'Leary |
| 2013/0232023 A2 | 9/2013 | Muse |
| 2013/0238478 A1 | 9/2013 | Bruno |
| 2013/0246233 A1 | 9/2013 | Hakim |
| 2013/0254052 A1 | 9/2013 | Royyuru et al. |
| 2013/0294602 A1 | 11/2013 | Huxham et al. |
| 2013/0305345 A1 | 11/2013 | Bugenhagen |
| 2013/0311266 A1 | 11/2013 | Vichich et al. |
| 2013/0311348 A1 | 11/2013 | Samid |
| 2013/0317972 A1 | 11/2013 | Morgenstern et al. |
| 2013/0317984 A1 | 11/2013 | O'Leary et al. |
| 2013/0322621 A1 | 12/2013 | Yoon et al. |
| 2013/0325701 A1 | 12/2013 | Schwartz |
| 2013/0331063 A1 | 12/2013 | Cormier et al. |
| 2013/0340040 A1 | 12/2013 | Park et al. |
| 2013/0344864 A1 | 12/2013 | Park et al. |
| 2014/0003604 A1 | 1/2014 | Campagna et al. |
| 2014/0025473 A1 | 1/2014 | Cohen |
| 2014/0032267 A1 | 1/2014 | Smith et al. |
| 2014/0040157 A1 | 2/2014 | Cohen et al. |
| 2014/0040628 A1* | 2/2014 | Fort .................. H04L 63/18 713/182 |
| 2014/0049653 A1 | 2/2014 | Leonard et al. |
| 2014/0053241 A1 | 2/2014 | Norrman et al. |
| 2014/0073375 A1 | 3/2014 | Li et al. |
| 2014/0081710 A1 | 3/2014 | Rabie |
| 2014/0082358 A1 | 3/2014 | Nakhjiri et al. |
| 2014/0082359 A1 | 3/2014 | Nakhjiri et al. |
| 2014/0087790 A1 | 3/2014 | Babbage et al. |
| 2014/0101444 A1 | 4/2014 | Lee et al. |
| 2014/0108801 A1 | 4/2014 | McBride et al. |
| 2014/0115335 A1 | 4/2014 | Jorden et al. |
| 2014/0120874 A1 | 5/2014 | Kang et al. |
| 2014/0122878 A1 | 5/2014 | Cho et al. |
| 2014/0122903 A1 | 5/2014 | Endo et al. |
| 2014/0140507 A1 | 5/2014 | Park et al. |
| 2014/0140509 A1 | 5/2014 | Chastain et al. |
| 2014/0141113 A1 | 5/2014 | Kohler |
| 2014/0141869 A1 | 5/2014 | Shore |
| 2014/0143534 A1 | 5/2014 | Chastain et al. |
| 2014/0143826 A1 | 5/2014 | Sharp et al. |
| 2014/0156497 A1 | 6/2014 | Mehew et al. |
| 2014/0164251 A1 | 6/2014 | Loh |
| 2014/0165155 A1 | 6/2014 | Zhang |
| 2014/0192976 A1 | 7/2014 | Yoon et al. |
| 2014/0219447 A1 | 8/2014 | Park et al. |
| 2014/0219448 A1 | 8/2014 | Froels et al. |
| 2014/0233740 A1 | 8/2014 | Niamut et al. |
| 2014/0235210 A1 | 8/2014 | Park et al. |
| 2014/0237101 A1 | 8/2014 | Park |
| 2014/0244994 A1 | 8/2014 | Yu |
| 2014/0273913 A1 | 9/2014 | Michel et al. |
| 2014/0281483 A1 | 9/2014 | Vigliaturo et al. |
| 2014/0287725 A1 | 9/2014 | Lee |
| 2014/0308991 A1 | 10/2014 | Lee et al. |
| 2014/0310527 A1 | 10/2014 | Veugen et al. |
| 2014/0329502 A1 | 11/2014 | Lee et al. |
| 2014/0337937 A1 | 11/2014 | Truskovsky et al. |
| 2014/0344015 A1 | 11/2014 | Puertolas-Montanes et al. |
| 2014/0351403 A1 | 11/2014 | Lin et al. |
| 2014/0357229 A1 | 12/2014 | Lee et al. |
| 2014/0379428 A1 | 12/2014 | Phansalkar et al. |
| 2015/0012743 A1 | 1/2015 | Holtmanns et al. |
| 2015/0017910 A1 | 1/2015 | Li et al. |
| 2015/0033301 A1 | 1/2015 | Pianese et al. |
| 2015/0071139 A1 | 3/2015 | Nix |
| 2015/0089214 A1 | 3/2015 | Dupre |
| 2015/0092590 A1 | 4/2015 | Zhu et al. |
| 2015/0095514 A1 | 4/2015 | Yu |
| 2015/0095648 A1 | 4/2015 | Nix |
| 2015/0113275 A1 | 4/2015 | Kim et al. |
| 2015/0120567 A1 | 4/2015 | Van Rooyen et al. |
| 2015/0120569 A1 | 4/2015 | Belshe et al. |
| 2015/0121495 A1 | 4/2015 | Gao et al. |
| 2015/0170112 A1 | 6/2015 | DeCastro |
| 2015/0188906 A1 | 7/2015 | Minov et al. |
| 2015/0193744 A1 | 7/2015 | Adleman |
| 2015/0215126 A1 | 7/2015 | Ashdown |
| 2015/0222604 A1 | 8/2015 | Ylonen |
| 2015/0222619 A1 | 8/2015 | Hughes et al. |
| 2015/0227897 A1 | 8/2015 | Loera |
| 2015/0244690 A1 | 8/2015 | Mossbarger |
| 2015/0262137 A1 | 9/2015 | Armstrong |
| 2015/0262138 A1 | 9/2015 | Hudon |
| 2015/0262139 A1 | 9/2015 | Shtylman |
| 2015/0262140 A1 | 9/2015 | Armstrong |
| 2015/0262141 A1 | 9/2015 | Rebernik et al. |
| 2015/0262168 A1 | 9/2015 | Armstrong |
| 2015/0262171 A1 | 9/2015 | Langschaedel et al. |
| 2015/0262172 A1 | 9/2015 | Rebernik |
| 2015/0262173 A1 | 9/2015 | Durbin et al. |
| 2015/0262176 A1 | 9/2015 | Langschaedel et al. |
| 2015/0281964 A1 | 10/2015 | Seo et al. |
| 2015/0296379 A1 | 10/2015 | Nix |
| 2015/0310424 A1 | 10/2015 | Myers |
| 2015/0324787 A1 | 11/2015 | Schaffner |
| 2015/0332283 A1 | 11/2015 | Witchey |
| 2015/0341422 A1 | 11/2015 | Farnlof et al. |
| 2015/0348169 A1 | 12/2015 | Harris et al. |
| 2015/0356523 A1 | 12/2015 | Madden |
| 2015/0356555 A1 | 12/2015 | Pennanen |
| 2015/0363777 A1 | 12/2015 | Ronca et al. |
| 2015/0363783 A1 | 12/2015 | Ronca et al. |
| 2015/0379510 A1 | 12/2015 | Smith |
| 2016/0014112 A1 | 1/2016 | Gunning et al. |
| 2016/0027229 A1 | 1/2016 | Spanos et al. |
| 2016/0028552 A1 | 1/2016 | Spanos et al. |
| 2016/0057725 A1 | 2/2016 | Suh |
| 2016/0078219 A1 | 3/2016 | Hernan |
| 2016/0080156 A1 | 3/2016 | Kaliski, Jr. |
| 2016/0086187 A1 | 3/2016 | Joao |
| 2016/0088096 A1 | 3/2016 | Quiriconi et al. |
| 2016/0092988 A1 | 3/2016 | Letourneau |
| 2016/0112200 A1 | 4/2016 | Kheterpal et al. |
| 2016/0125040 A1 | 5/2016 | Kheterpal et al. |
| 2016/0127132 A1 | 5/2016 | Lee et al. |
| 2016/0134616 A1 | 5/2016 | Koushik et al. |
| 2016/0149903 A1 | 5/2016 | Suh |
| 2016/0162873 A1 | 6/2016 | Zhou et al. |
| 2016/0164678 A1 | 6/2016 | Nix |
| 2016/0203448 A1 | 7/2016 | Metnick et al. |
| 2016/0212617 A1 | 7/2016 | Koshimizu et al. |
| 2016/0269386 A1 | 9/2016 | Nix |
| 2016/0294829 A1 | 10/2016 | Angus |
| 2017/0005804 A1 | 1/2017 | Zinder |
| 2017/0017955 A1 | 1/2017 | Stern et al. |
| 2017/0091750 A1 | 3/2017 | Maim |
| 2017/0124535 A1 | 5/2017 | Juels et al. |
| 2017/0132630 A1 | 5/2017 | Castinado et al. |
| 2017/0188231 A1 | 6/2017 | Nix |
| 2017/0206532 A1 | 7/2017 | Choi |
| 2017/0237561 A1 | 8/2017 | Nix |
| 2017/0373845 A1 | 12/2017 | Nix |
| 2018/0254897 A1 | 9/2018 | Nix |

(56) References Cited

U.S. PATENT DOCUMENTS

| | | |
|---|---|---|
| 2018/0262329 A1 | 9/2018 | Nix |
| 2018/0270059 A1 | 9/2018 | Nix |
| 2020/0259652 A1 | 8/2020 | Schmaltz, III et al. |
| 2020/0351263 A1 | 11/2020 | Tiruvaipeta et al. |
| 2021/0266309 A1 | 8/2021 | Guccione et al. |

FOREIGN PATENT DOCUMENTS

| | | |
|---|---|---|
| CA | 2775853 A1 | 12/2017 |
| EP | 1981224 A1 | 7/2011 |
| EP | 2634738 A1 | 9/2013 |
| JP | WO2016088659 | 9/2019 |
| WO | WO0026745 A2 | 5/2000 |
| WO | WO2008127428 | 12/2008 |
| WO | WO2011008630 A1 | 1/2011 |
| WO | WO2011138238 A1 | 11/2011 |
| WO | WO2013027085 A1 | 2/2013 |
| WO | WO2013034278 A2 | 3/2013 |
| WO | WO2013066077 A1 | 5/2013 |
| WO | WO2015059669 | 4/2015 |
| WO | WO2015085393 | 6/2015 |
| WO | WO2015113519 | 8/2015 |
| WO | WO2016029119 | 2/2016 |
| WO | WO2015179020 | 3/2016 |
| WO | WO2016022864 | 4/2016 |

OTHER PUBLICATIONS 2-of-3 Paper Wallets, Bitcoin Forum (published Jan. 29, 2013), https://bitcointalk.org/index.php?topic=139625.msg1487254 (last visited Dec. 4, 2013).

3GPP, 3rd Generation Partnership Project; Technical Specification Group Core Network and Terminals; Non-Access-Stratum (NAS) protocol for Evolved Packet System (EPS); Stage 3, 3GPP TS 24.301 v12.2.0, Sep. 2013 pp. 1-6, 63-100.

A Physical Price Tag for a Digital Currency. Introducing Bittag., BitTag, http://bittag.net/ (last visited Feb. 5, 2014).

A powerful trading platform for Bitcoin traders, BTXTrader.com (Aug. 13, 2013) Internet Archive, https://web.archive.org/web/20130813052513/http:www.btxtrader.com/.

A. Wander et al. Energy Analysis of Public-Key Cryptography on Small Wireless Devices, Sun Microsystems Laboratories, Published 2005, pp. 1-16.

About Bitcoin, Bitcoin.org (May 2, 2013) Internet Archive, http://web.archive.org/web/20130502214154/http://bitcoin.org/en/about.

Sanjay Panikkar et al., ADEPT: An IoT Practitioner Perspective, IBM (2015).

All About Bitcoin, Goldman Sachs, Global Macro Research, Top of Mind, Issue 21 (Mar. 11, 2014).

"AlphaPoint Announces Blockchain Solution Custom-Built for Financial Institututions," AlphaPoint, https://globenewswire.com/news-release/2015/10/26/779929/0/en/AlphaPoint-Announces-blockchain-solution-custom-built-for-financial-institutions.html, Oct. 26, 2015, 3 pages.

"Digital Currency Exhange Goes Live to Publin in Melbourne, Australia," AlphaPoint, https://globenewswire.com/news-release/2015/12/10/794524/0/en/Digital-Currency-Exchange-Goes-Live-to-Public-in-Melbourne-Australia.html, Dec. 10, 2015, 3 pages.

An Open Source P2P Digital Currency, Bitcoin.org, http://bitcoin.org/en/ (last visited Jul. 22, 2013).

Appenzeller et al., Identity-Based Encryption Architecture and Supporting Data Structures RFC 5408, 2009, pp. 1-30.

Ashlee Vance & Brad Stone, The Bitcoin-Mining Arms Race Heats Up, BloombergBusinessweek, http://www.businessweek.com/articles/2014-01-09/bitcoin-minig-chips-gear-computing-groups-competition-heats-up (last visited Jan. 9, 2014).

Jon Southurst, ATM Industry Association Publishes Report on Bitcoin ATMs, CoinDesk (Published Mar. 20, 2014), http://www.coindesk.com/atm-industry-association-publishes-report-bitcoin-atms/ (last visited Mar. 21, 2014).

Durnford, Barter netwrok aims to help Mile End's cash-strapped live well, The Gazette [Montreal, Que] (Jan. 23, 1996).

Baugher et al., Group Key Management Architecture, RFC Draft, 2001, pp. 1-20.

Ben Saied, Yosra; Olivereau, Alexis; Laurent, Maryline; "A Distributed Approach for Secure M2M Communications", 5th International Conference on New Technologies, Mobility and Security (NTMS), May 7-10, 2012, pp. 1-7.

Bender et al., Evolution of SIM provisioning towards a flexible MCIM provisioning in M2M vertical industries, 16th International Conference on Intelligence in Next Generation Networks, IEEE, 2012, pp. 57-64.

Nick Szabo, Bit gold, unenumerated.blogspot.com (Mar. 29, 2006) Internet Archive, https://web.archive.org/web/20060329122942/http://unenumerated.blogspot.com/2005/12/bit-gold.html.

David Andolfatto, Bitcoin and Beyond: The Possibilities and Pitfalls of Virtual Currencies, Federal Reserve Bank of St. Louis, Dialouge with the Fed, Beyond Today's Financial headlines (Mar. 31, 2014).

Joe Adler, Bitcoin Backers Seek FDIC-Style Insurance, American Banker (Jan. 22, 2014), http://www.americanbanker.com/issues/179_15/bitcoin-backers-seek-fdic-style-insurance-1065089-1.html?zkPrintable=true.

Stephen Foley & Alice Ross, Bitcoin bubble grows and grows, Financial Times, http://www.ft.com/intl/cms/s/0/b4be7d8e-9c73-11e2-9a4b-00144feabdc0/html (last visited Oct. 30, 2013).

Bitcoin Moves Closer to Regulation, Stratfor Flobal Intelligence (Jan. 29, 2015), https://www.stratfor.com/sample/analysis/bitcoin-moves-closer-regulation#axzz/ (last visited Jan. 30, 2015).

Bitcoin Now on Bloomberg, Bloomberg Now (Apr. 30, 2014) Internet Archive, https://web.archive.org/web/20140430184511/http://www.bloomberg.com/now/2014-04-30/bitcoin-now-bloomberg/.

Bitcoin Theft Insurance, Ecoin Club (published Dec. 3, 2013), http://ecoinclub.com/bitcoin-insurance/ (Last visited Dec. 5, 2013).

Bitcoin's First Kiosk, Robocoin (Jul. 2, 2013) Internet Archive, https://web.archive.org/web/20130702171110/https://robocoinkiosk.com/.

Bitcoin's First Real ATM, Robocoin Blog, http://blog.robocoinkiosk.com/ (last visited Nov. 11, 2013).

Bitcoin, Wikipedia (Jun. 24, 2013), Internet Archieve http://web.archieve.org/web/20130624030646/http://en.wikipedia.org/wiki/Bitcoin.

Bitcoin: a first assessment, FX and Rates | Global, Bank of America Merrill Lynch (Dec. 5, 2013).

Francois R. Velde, Bitcoin: A primer, The Federal Reserve Bank of Chicago, Chicago Fed Letter (Dec. 2013).

John Heggestuen, Bitcoin: How It Works, and How It Could Fundamentally Change How Companies and Individuals Handle Payments, BI Intelligence (Jan. 30, 2014).

Bitcoin: Intrinsic Value as Conduit for Disruptive Payment Network Technology, Wedbush, Computer Services: Financial Technology (Dec. 1, 2014).

Bitcoin: Questions, Answers, and Analysis of Legal Issues, Congressional Research Service (Dec. 20, 2013).

Anton Badev and Matthew Chen, Bitcoin: Technical Background and Data Analysis, Finance and Economics Discussion Series, Divisions of Research & Statistics and Monetary Affairs, Federal Reserve Board, Washington, D.C. (Oct. 7, 2014).

Julieta Duek and Demian Brener, Bitcoin: Understanding and Assesing potential Opportunities, Quasar Ventures (Jan. 2014).

Bitcoin: Watch the Innovation, Not the Price, Wedbush, Computer Services: Financial Technology (Feb. 14, 2014).

BitcoinAverage.com—independent bitcoin price, Bitcoin Forum, https://bitcointalk.org/index.php?topic=270190.0 (last visited Feb. 24, 2014).

BitcoinAverage.com, Reddit, http://www.reddit.com/r/rBitcoin/comments/1jl9c2/ (last visited Feb. 24, 2014).

Bitcoinaverage code respository, GitHub, https://github.com/bitcoinaverage/bitcoinaverage/commits/master?page=134 (last visited Feb. 24, 2014).

Bitcoins and Banks: Problematic currency, interesting paymetn system, UBS, Global research (Mar. 28, 2014).

(56) References Cited

OTHER PUBLICATIONS

Bitcoins the hard way: Using the raw Bitcoin protocol, Ken Shirriff's blog, (Feb. 3, 2014) Internet Archive, https://web.archive.org/web/20140203192446/http://www.righto.com/2014/02/bitcoins-hard-way-using-raw-bitcoin.html.
Bitflash Weekly Review (Apr. 14, 2014), Pantera, https://panteracapital.com/bitflash/ (last visited Apr. 15, 2014).
"Blockchain Technologies Corp Makes History, 2016 Iowa Caucus Results Forever Documented on Blockchain", https://globenewswire.com/news-release/2016/02/06/808320/1059855/en/Blockchain-technologies-corp-makes-history-2016-iowa-caucus-results-forever-documented-on-blockchain.html, Feb. 5, 2016, 2 pages.
Blocktrail | Bitcoin Block, Explorer, Blocktrail (Aug. 18, 2014), https://www.blocktrail.com/.
Boyen et al., Anonymous Hierarchial Identity-Based Encryption (Without Random Oracles), 2006.
Boyen et al., Identity-Based Cryptography Standard (IBCS) #1: Supersingular Curve Implementations of the BF and BB1 Cryptosystems, RFC 5091, 2007, pp. 1-63.
BTC, Google Finance, https://www.google.com/finance?q=CURRENCY%3ABTC&ei=T-euU7jVFZOUwQPNkIHYCQ (last visited Jul. 11, 2014).
Buying and Selling Linden Dollars, Second Life, http://community.secondlife.com/t5/English-Knowledge-Base/Buying-and-selling-Linden-dollars/ta-p/700107 (last visited Dec. 9, 2013).
C. Downey, Migrating Legacy M2M Systems to the Cloud, http://www.ecnmag.com/articles/2013/02/migratingegacy-m2m-systems-cloud, Feb. 2013, pp. 1-2.
Cakulev et al., "An EAP Authentication Method Based on Identity-Based Authenticated Key Exchange", Aug. 2012, pp. 1-32.
Chang-Seop Park, On Certificate-Based Security Protocols for Wireless Mobile Communication Systems, Dankook University, IEE Network Sep./Oct. 1997, pp. 50-55.
Charts, Bitcoin Charts (May 10, 2013) Internet Archive, https://web.archive.org/web/20130510172057/http://bitcoincharts.com/charts.
Choose Your Wallet, Bitcoin.org (May 30, 2013) Internet ARchieve, http://web.archive.org/web/20130530072551/http://bitcoin.org/en/choose-your-wallet.
Chris Foresman, Embedded SIM could caus carrier conflict for Apple, Nov. 19, 2010, pp. 1-2.
Circle (May 19, 2014) Internet Archive, https://web.archive.org/web/20140519175717/https://www.circle.com/.
Jonathan Shieber, Circle Emerges From Stealth to Bring Bitcoin to the Masses, TechCrunch (May 18, 2014) Internet Archive, https://web.archive.org/web/20140518130248/http://techcrunch.com/2014/05/15/circle-emerges-from-stealth-to-bring-bitcoin-to-the-masses/.
Coinbase, Bitcoin Wallet, https://coinbase.com/ (last visited Aug. 15, 2013).
Coinbase, Bitcoin Wallet, Bitcoin made simple, https://coinbase.com/ (last visited Aug. 15, 2013).
Jon Matonis, CoinDesk Launches Proprietary Bitcoin Price Index, CoinDesk (published Sep. 11, 2013), http://www.coindesk.com/coindesk-launches-proprietary-bitcoin-price-index/ (last visited Oct. 30, 2013).
CoinDesk, Bitcoin Price Index, http://www.coindesk.com/price/ (last visited Oct. 28, 2013).
CoinDesk, This week we released the first version of our mobile app on iPhone, Twitter (published May 2, 2014), https://twitter.com/coindesk/status/462255287177453568?refsrc=email (last visited May 5, 2014).
Daniel Palmer, Coinfloor Plans Europe's First Bitcoin ETF, Adds USD Support, CoinDesk (Oct. 21, 2014), http://www.coindesk.com/coinfloor-launch-bitcoin-trading-fund-adds-new-currencies/ (last visited Oct. 22, 2014).
Coinsetter Launches Out of Beta, Platform Now a Full U.S. Bitcoin Exchange, Coinsetter blog (Jul. 24, 2014), http://www.coinsetter.com/blog/2014/07/24/coinsetter-launches-beta-platform-now-full-us-bitcoin-exchange/ (last visited Jul. 24, 2014).

CSMG, Reprogrammable SIMs: Technology, Evolution and Implications, Sep. 25, 2012, pp. 1-95.
CSMG, SMG, Reprogrammable SIMs: Technology, Evolution and Implications, Sep. 25, 2012, pp. 1-95.
D. McGrew et al, Fundamental Elliptic Curve Cryptography Algorithms, Internet Engineering Task Force RFC 6090, Feb. 2011, pp. 1-34.
Daniel Roberts, On Winklevoss Bitcoin index, it's open season for developers, Fortune, (Jul. 22, 2014).
Digitizing Trust: Leveraging the Bitcoin Protocol Beyond the "Coin", Wedbush, Computer Services: Financial Technology (Jan. 2, 2014).
Ina Steiner, eBay Mulls New Feature to Eliminate Deadbeat Bidders, EcommerceBytes Blog (published May 12, 2012) http://www.ecommercebytes.com/C/blog.pl?/pl/2012/5/1336831866.html (last visited May 30, 2014).
Electrum, Bitcoin wiki, https://en.bitcoin.it/wiki/Electrum (last visited Jul. 22, 2013).
Elliptic Vault: Secure, Worry-free Storage for Your Bitcoins, Elliptic.co (Jan. 12, 2014) Internet Archive, https://web.archive.org/web/20140112043128/https://www.elliptic.co/vault.
Embedded UICC Remote Provisioning Discussion, Source: Rogers Wireless, Contact: Ed O'Leary (ed_oleary@rcirogers.com), George Babut (gbabut@rcLrogers_com), 3GPP/SA3-LI#46, Quebec City, Canada, Jul. 17-19, 2012, pp. 1-39.
Daniel Cawrey, Eschewing Price, Pantera Launches BitIndex to Track Bitcoin, CoinDesk (Jul. 10, 2014), http://www.coindesk.com/eschewing-price-pantera-launches-bitindex-track-bitcoin/ (last visited Jul. 11, 2014).
ETSI, Smart Cards; Embedded UICC; Requirements Specification, TS 103383 v12.1.0, Jun. 2013, pp. 1-20.
ETSI, Smart Cards; UICC—TerminalInterfaces; Physical and Logical Characteristics, TS 102 221 v11.0.0, Jun. 2012, pp. 1-181.
ETSI, UMTS;L TE; SIM/USIM Internal and ExternalInterowrking Aspects, TR 131 900 v.10.0.0, May 2011, pp. 1-41.
Eun-Jun Yoon, et al. Secure Deniable Authentication Protocol Based on ElGamal Cryptography, 2008 International Conference on Information Security and Assurance, pp. 36-39.
David Harper, Exploring the Exponentially Weighted Moving Average, Investopedia (Mar. 18, 2007) Internet Archive, https://web.archive.org/web/20070318160651/http://www.investopedia.com/articles/07/EWMA.asp.
F. Qian et al., TOP: Tail Organization Protocol for Cellular Resource Allocation, 18th IEEE International Conference on Network Protocols (ICNP), 2010, pp. 285-298.
FAQ: What's the Difference Between PPCoin and Bitcoin?, GitHub, https://github.com/ppcoin,ppcoin/wiki/FAQ (last visited Jul. 22, 2013).
First Bitcoin Capital Corp.(otc markets:BITCF) Launches Digital Currency Exchange, CoinQX.com in Beta, The Wall Street Journal MarketWatch, http://www.marketwatch.com/stroy/first-bitcoin-capital-corpotc-markets-bitcf-launches-digital-currency-exchange-coinqxcom-in-beta-2014-05-21 (last visited May 21, 2014).
GlobalPlatform Inc., GlobalPlatform Card Specification, Version 2.2.1, Jan. 2011, pp. 1-303.
GlobalPlatform, Inc., GlobalPlatform Card Security Upgrade for Card Content Managment, Card Specification v 2.2-amendment E, Version 1.0, Nov. 2011, pp. 1-35.
Gollmann, "Authentication—Myths and Misconceptions", Progress in Computer Science and Applied Logic, vol. 20, 2001, pp. 203-225.
GSM Association, Embedded SIM Task Force Requirements and Use Cases, Version 1.0, Feb. 21, 2011, pp. 1-38.
GSMA Launches Embedded SIM Initiative to Support the Connected Future, Nov. 18, 2010, pp. 1-4.
Harney et al., Froup Key Management Protocol (GKMP) Architecture, 1994, pp. 1-19.
Hegland et al., "A Framework for Authentication in NBD Tactical Ad Hoc Networks", IEEE Communications Magazine, Oct. 2011, pp. 64-71.
How Bitcoin is Driving Digital Innovation in Entertainment, Mediaand Communications (EMC), PwC Consumer Intelligence Series, Digital Disruptor, (Jan. 27, 2014).

(56) References Cited

OTHER PUBLICATIONS

How Bitcoin Works Under the Hood, Imponderable Things (Scott Driscoll's Blog) (published Jul. 14, 2013), http://www.imponderablethings.com/2013/07/how-bitcoin-works-under-hood.html (last visited Oct. 10, 2013).

How DigiCash Blew Everything, Next (published Jan. 1999), http://cryptome.org/jya/digicrash.htm (last visited Jan. 9, 2014).

How Does Bitcoin Work?, Bitcoin.org, (May 1, 2013) Internet Archive, http://web.archive.org/web/20130501092121/http://bitcoin.org/en/how-it-works.

How is Mt. Gox weighted average calculated?, Bitcoin Forum (Mar. 18, 2013), https://bitcointalk.org/index.php?topic=154548.0 (last visited Jul. 25, 2013).

Independent Bitcoin Price, BitcoinAverage, https://bitcoinaverage.com/explain.htm (last visited Mar. 4, 2014).

International Search Report and Written and Opinion for PCT/US2014/062435 mailed Feb. 6, 2015.

Introducing BDIC: Bitcoin's decentralized, privately-funded version of the FDIC, Reddit (Published Dec. 4, 2013), http://www.reddit.com/r/Bitcoin/comments/1s365o/introducing_bdic_bitcoins_decentralized/ (last visited Dec. 5, 2013).

J. Huang et al., A Close Examination of Performance and Power Characteristics of 4G LTE Networks, Mobisys' 12, Jun. 25-29, 2012, pp. 1-14.

J. Jonsson et al., Public-Key Cryptography Standards (PKCS0 #1: RSA Cryptography Specifications Version 2.1, Internet Engineering Task Force RFC 3447, Feb. 2003, pp. 1-72.

Jeanine Hightower-Sellitto Decleration under 37 C.F.R § 1.132 filed in U.S. Appl. No. 15/960,040 on Feb. 15, 2019.

Jerry Brito, et al., Bitcoin, A Primer for Policymakers (2013).

The audacity of bitcoin, Risks and opportunites for corporates and investors, Global rates & FX Research, J.P. Morgan (Feb. 11, 2014), http://www.jpmorganmarkets.com/GlobalFXStrategy.

Brian Cohen, JPMorgan Chase Building Bitcoin-Killer, Lets Talk Bitcoin (published Dec. 9, 2013) http://letstalkbitcoin.com/jpmorgan-chase-building-bitcoin-killer/ (last visited Dec. 10, 2013).

Ken Hawkins, Exchange-Traded Funds (EFTs), Investopedia (May 12, 2013) Internet Archive, https://web.archive.org/web/20130512125447/http://www.investopedia.com/university/exhnage-traded-fund/.

Kiltz et al., CCA2 Secure IBE: Standard Model Efficiency through Authenticated Symmetric Encryption, 2008.

Kirk H.M. Wong et al., A Dynamic User Authentication Scheme for Wireless Sensor Networks, Proceedings of the EEE International Conference on Sensor Networks, Ubiquitous, and Trustworthy Computing (SUTC'06), pp. 1-8.

Krylov, What is Kerberos Authentication?, 2003, pp. 1-4.

L. Larzon, The Lightweight User Datagram Protocol (UDP-Lite), Internet Engineering Task Force RFC 3828, Jul. 2004, pp. 1-12.

Lisa Fleisher, London's New Bitcoin Exchange Hopes to Avoid Mt. Gox Fate, The Wall Street Journal (published Apr. 30, 2014), http://blogs.wsj.com/digits/2014/04/30/londs-new-bitcoin-exchange-hopes-to-avoid-mt-gox-fate/ (last visited May 1, 2014).

[ANN] M-of-N "Fragmented Backups" now in Aromory (command-line only), Bitcoin Forum (Mar. 6, 2013), https://bitcointalk.org/index.php?topic=149820.0 (last visited Dec. 4, 2013).

M. Prasad, et al., Secure Authentication Key Agreement Protocol for Long Term Evolution—Advanced, Research Scholar, Associate Professor, Department of Computer Science & Engineering, Pondicherry Engineering College, Puducherry, India, Elsevier, 2012, pp. 158-162.

Major Bitcoin Investment Firm Launches Bitindex, The Crypto Crimson, (published Jul. 10, 2014), http://cryptocrimson.com/2014/07/major-bitcoin-investment-firm-launches-bitindex/ (last visited Jul. 11, 2014).

Marketplace—Gemini, web.archive.org (Last modified Jan. 8, 2018) http://web.archive.org/web/20180125115941/https://gemini.com/marketplace/, Internet.

Marketplace—Gemini, web.archive.org (Last modified Nov. 25, 2017) http:web.archive.org/web/20171211092415/https://gemini.com/marketplace/, Internet.

Marketplace, gemini.com (Last modified Sep. 20, 2018) https://gemini.com/marketplace/, Internet.

Markets API, Bitcoin Charts (Jun. 3, 2013) INternet Archive, https://web.archive.org/web/20130603091557/http://bitcoincharts.com/about/markets-api.

Martin, Introduction to Identity-Based Encryption, ISBN-13 978-1-59693-238-8, 2008.

Max Raskin, Cameron and Tyler Winklevoss on Bitcoin and Their Public Persona, BloombergBusinessweek, http://www.businessweek.com/articles/2013-08-08/cameron-and-tyler-winklevoss-on-bitcoin-and-their-public-persona (last visited Aug. 8, 2013).

James Ball, Meet the seven people who hold the keys to worldwide internet security, The Guardian, http://www.theguardian.com/technology/2014/feb/28/seven-people-keys-worldwide-internet-security-web (last visited Mar. 7, 2014).

Merrian-Webster, Network, 2014.

N. Chu, et al., Exalted: Expanding LTE for devices, European Commision for Information Society and Media, Oct. 31, 2012, pp. 1-141.

"Nasdaq Launches Enterprise-Wide Blockchain Technology Initiative", Nasdaq, https://globenewswire.com/news-release/2015/05/11/734456/10133665/en/nasdaq-launches-enterprise-wide-blockchain-technology-initiative.html, May 11, 2015, 3 pages.

Nasdaq Linq Enables First-Ever Private Securites Issuance Documented with Blockchain Technology, Nasdaq, https://globenewswire.com/news-release/2015/12/20/798660/0/en/Nasdaq-Linq-enables-first-ever-private-securities-issuance-documented-with-blockchain-technology.html, Dec. 30, 2015, 3 pages.

Nicholson et al., "Mobile Device Security Using Transient Authentication", IEEE Transactions on Mobile Computing, vol. 5, No. 11, Nov. 2006, pp. 1489-1502.

Notice of References Cited, U.S. Appl. No. 12/192,809 (Oct. 10, 2012).

NYC Bitcoin Exchange Coinsetter Launches Out of Beta With Institutional and Consumer Trading, MarketWatch (published Jul. 24, 2014), http://www.marketwatch.com/stroy/nyc-bitcoin-exchange-coinsetter-launches-out-of-beta-with-institutional-and-consumer-trading-2014-07-24 (last visited Jul. 24, 2014).

Office Action for U.S. Appl. No. 16/947,667 mailed on Sep. 28, 2021, Andrew Laucius, "Authenticating a User Device Associated With a User to Communicate via a Wireless Network in a Secure Web-Based Environment", 9 pages.

Online auctions: An in-depth look, National Consumers League, http://www.ncInet.org/personal-finance/121-online-auctions/279online-auctions-an-in-depth-look (last visted May 30, 2014).

Park et al., A New Practical Identity-Based Encryption System, 2003, pp. 1-27.

Park et al., Secure Profile Provisioning Architecture for Embedded UICC, 2013 International Conference on Availability, Relability and Security, IEEE, 2013, pp. 297-303.

Pierre E. Abi-Char, et al., A Fast and Secure Elliptic Curve Based Authenticated Key Agreement Protocol for Low Power Mobile Communications, The 2007 International Conference on Next Generation Mobile Applications, Services and Technologies (NGMAST 2007), pp. 1-6.

Pietre-Cambacedes et al., Cryptographic key management for SCADA systems—issues and perspectives, 2008 International Conference on Information Security and Assurance, IEEE, pp. 156-161.

PPCoin Proof of Stake Minting Setup Guide, Bitcoin Forum (Apr. 25, 2013) https://bitcointalk.org/index.php?topic=1877714.0 (last visited Jul. 22, 2013).

PPCoin, Wikipedia, http://en.wikipedia.org/wiki/PPCoin (last visited Jul. 22, 2013).

Sunny King & Scott Nadal, PPCoin: Peer-to-Peer Crypto-Currency with Proof-of-Stake, (Aug. 19, 2012).

Private Bitcoin Insurance, Inscrypto, http://go.inscrypto.com (last visited Jan. 24, 2014).

Proof of stake instead of proof of work, Bitcoin Forum, https://bitcointalk.org/index.php?topic=27787 (last visited Nov. 6, 2015).

(56) References Cited

OTHER PUBLICATIONS

Larry Ren, Proof of Stake Velocity: Building the Social Currency of the Digital Age, www.redcoin.com (Apr. 2014).
Proof-of-stake, Wikipedia, http://en.wikipedia.org/wiki/Proof-of-stake (last visited Jul. 22, 2013).
Protocol of Bitcoin, Wikipedia, http://en.wikipedia.org/wiki/Bitcoin_mining (last visited Jul. 22, 2013).
Rachel Abrams, Winklevoss Twins to List Bitcoin Fund on Nasdaq, The New York Times DealB%k, http://dealbook.nytimes.com/2014/05/08/winklevoss-twins-to-list-bitcoin-fund-on-nasdaq/ (last visited May 8, 2014).
Evan L. Greebel et al., Recent Key Bitcoin and Virtual Currency Regulatroy and Law Enforecment Developments, Virtual Currency Advisory, Katten Muchin Rosenman LLP (Nov. 13, 2014).
Request for Administrative Ruling on the Application of FinCEN's Regulations to a Virtual Currency Payment System, United States Department of the Treasury, FinCEN, (Oct. 27, 2014). FIN-2014-R011.
Ronald A. Glantz, Pantera Primer, (Mar. 11, 2014).
"RR Donnelley to Pursue New Blockchain-Eneabled Capabilities for Publishing Industry," https://globenewswire.com/news-release/2016/03/14/819355/0/en/pr-donnelley-to-pursue-new-blockchain-enabled-capabilities-for-publishing-industry.html, Mar. 14, 2016, 3 pages.
Schwaiger Et al., "Smart Card Security for Fieldbus Systems", 2003, pp. 398-406.
Secuirty for Your Peace of Mind, Coinbase, https://coinbase.com/security (last visited Oct. 28, 2013).
Securing Your Wallet, Bitcoin.org (Jul. 21, 2013) Internet Archive, http://web.archive.org/web/20130721194621/http://bitcoin.org/en/secure-your-wallet.
Shamir's Secret Sharing, Wikipedia, http://en.wikipedia.org/wiki/Shamir's_Secret_Sharing (last visited Jul. 22, 2013).
Rob Wile, Shares of No-Name Tech Company Go Crazy After It Announces It's Getting Into the Bitcoin Game, business Insider, http://www.businessinsider.com/wcps-bitcoin-2013-12?hr_email_referer=1&utm_source=Triggermail&utm_medium=email&utm_content=emailshare (last visited Dec. 30, 2013).
Shih, Jie-Ren et al., "Securing M2m with Post-Quantum Public-Key Cryptography", IEE Journal on Emerging and Selected Topics in Circuts and Systems, Mar. 7, 2013, pp. 106-116.
Some Things You Need to Know, Bitcoin.org (May 2, 2013) Internet Archive, http://web.archive.org/web/20130502051011/http://bitcoin.org/en/you-need-to-know.
State of Bitcoin 2014, CoinDesk (Feb. 26, 2014).
T. Pornin, Deterministic Usage of the Digital Signature Algorithm (DSA) and Elliptic Curve Digital Signature Algorithim (ECDSA), Internet Engineering Task Force RFC 6979, Aug. 2013, pp. 1-79.
Jeremy Allaire, What We Have Been up to at Circle, The Circle Blog (May 19, 2014) Internet Archive, https://web.archive.org/web/20140519162958/https://www.circle.com/2014/05/15/circle-update/.
The Ripple Network Review—What is Ripple?, Donald McIntyre—Etherplan (Aug. 1, 2013) https://etherplan.com/2013/08/01/the-ripple-network-what-is-ripple/4103/ , Internet.
TigerDirect.com Now Accepts Bitcoin Payments!, TigerDirect, http://www.tigerdirect.com/bitcoin/ (last visited Feb. 6, 2014).
Timing and Sizing the Era of Bitcoin, Wedbush, Computer Services: Financial Technology (May 27, 2014).
Tin et al., "Provably Secure Mobile Key Exchange: Applying the Canetti-Krawczyk Approach," Information Security Research Centre, Queensland University of Technology, Australia, 2003, pp. 166-179.
Trading Namecoins for Bitcoins, Bitcoin Forum, https://bitcointalk.org/index.php?topic=6289.0 (last visited Nov. 6, 2015).
U.S. Appl. No. 60/884,172, (filed Jan. 9, 2007).
USD Average Price History, BitcoinAverage, https://bitcoinaverage.com/chart.hmt@USD-averages-all (last visited Feb. 24, 2014).
Using Offline Wallets in Armory, Armory (May 20, 2013) Internet Archive, http://web.archive.org/20130520100213/https://bitcoinarmory.com/using-offline-wallets-in-armory/.
V. Martinez et al., A Survey of the Elliptic Curve Integrated Encryption Scheme, Journal of Computer Science and Engineering, vol. 2, Aug. 2010, pp. 7-13.
Victoria Turk, Bitcoin 'Banks' Are Trying to Rebrand Cryptocurrencies for the Mainstream, Motherboard, http://motherboard.vice.com/en_ca/read/bitcoin-banks-try-to-rebrand-cryptocurrencies-for-the-mainstream (last visited May 5, 2014).
Voltage Security, The Identity-Based Encryption Advantage, 2015.
We make it easy to build secure, high level services on top of the Bitcoin protocol, Trusted Coin (Dec. 26, 2013) Internet Archive, https://web.archive.org/web/20131226232433/https://api.trustedcoin.com/f.
"What is Blockchain Technology?" Quora. N.p. 15, Jan. 2009. Jun. 9, 2017. <https://www.quora.com/What-is-blockchain-technology-1>.
Why Bitcoin Is Changing the World, Bitcoin.org (Jun. 20, 2013) Internet Archive, http:/web.archive.org/web/20130620062218/http://bitcoin.org/en/innovation.
Wikipedia, Digital Signature, http://en.wikipedia.org/wiki/Digital_Signature, Sep. 9, 2013, pp. 1-10.
Wikipedia, Elliptic Curve Cryptography, http://en.wikipedia.org/wiki/Elliptic_curve_cryptography, Sep. 9, 2013, pp. 1-8.
Wikipedia, Elliptic Curve Dithe-Hellman, http://en.wikipedia.org/wiki/Elliptic_curve_Dithe%E2%80%93Hellman, Sep. 24, 2013, pp. 1-2.
Wikipedia, RSA (algorithim), http://en.wikipedia.org/wiki/RSA_(algorithim), Sep. 9, 2013, pp. 1-12.
WINKBTCO Index, Bloomberg Finance L.P. (Jun. 16, 2014).
Winklevoss Bitcoin Trust Amendment No. 3 to Form S-1 Registration Statement, SEC (May 8, 2014), available at http://www.sec.gov/Archives/edgar/data/1579346/000119312514190365/d721187ds1a.htm.
Winklevosses' Gemini to Offer Cryptocurrency Block Trading, Olga Kharis and Matthew Leising, Bloomberg.com (Apr. 9, 2018) https://www.bloomberg.com/news/articles/2018-04-09/winklevoss-s-gemini-to-offter-cryptocurrency-block-trading , Internet.
World Gold Council, How SPDR Gold Shares (2840 HK) are Created and Redeemed (Mar. 2013).
John Biggs, Xapo Raises $20 Million to Bury Your Bitcoin Underground, TechCrunch (Mar. 14, 2014) Internet Archive, https://web.archive.org/web/20140314042301/http://techcrunch.com/2014/03/13/xapo-raises-20-million-to-bury-your-bitcoin-underground/.
Yacine Ghalim and Max Nieferhofer, bitcoin: Primer, State of Play, Discussion. Courmayeur, Sunstone Capital (Jan. 24, 2014).
Yang et al., Identity-Based Key Agreement and Encryption for Wireless Sensor Networks, IJCSNS International Journal of Computer Science and Network Security, vol. 6, No. 5B, May 2006, pp. 182-189.
Youngblood, An Introduction to Identity-based Cryptography, 2005.
Zhu et al., Public Key Cryptography for Initial Authentication in Kerberos (PPKINIT), RFC 4556, 2006, pp. 1-42.

\* cited by examiner

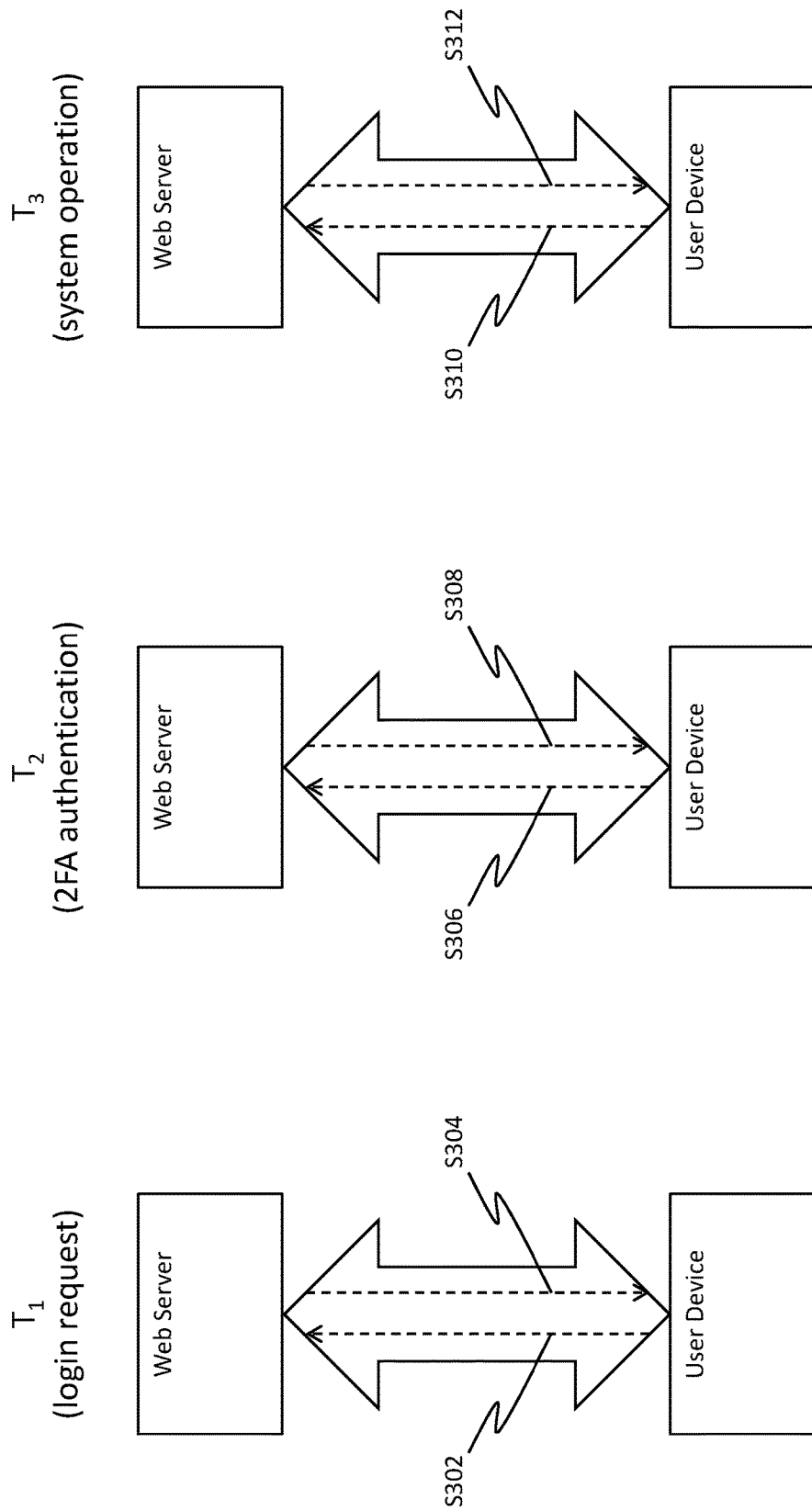

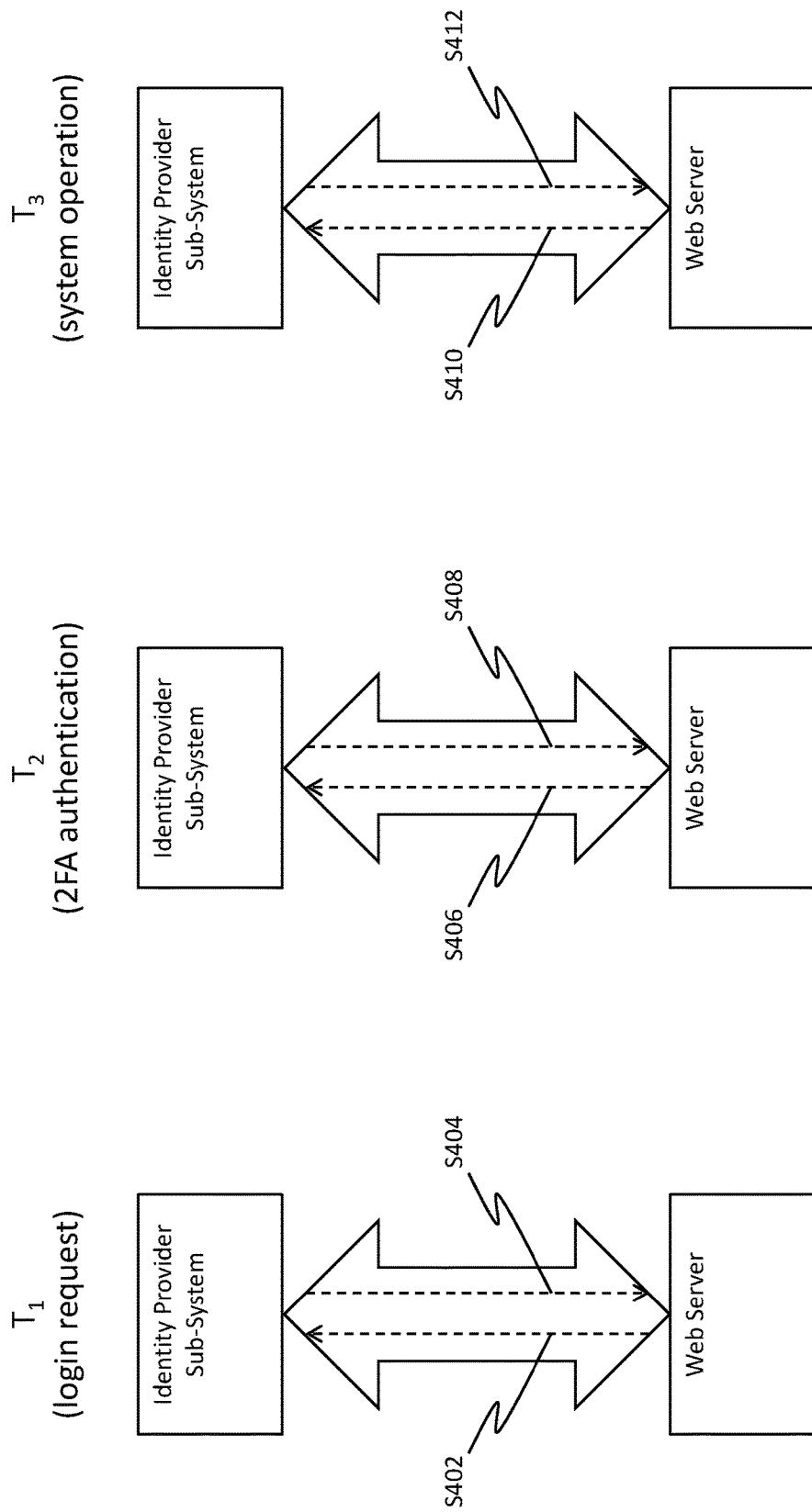

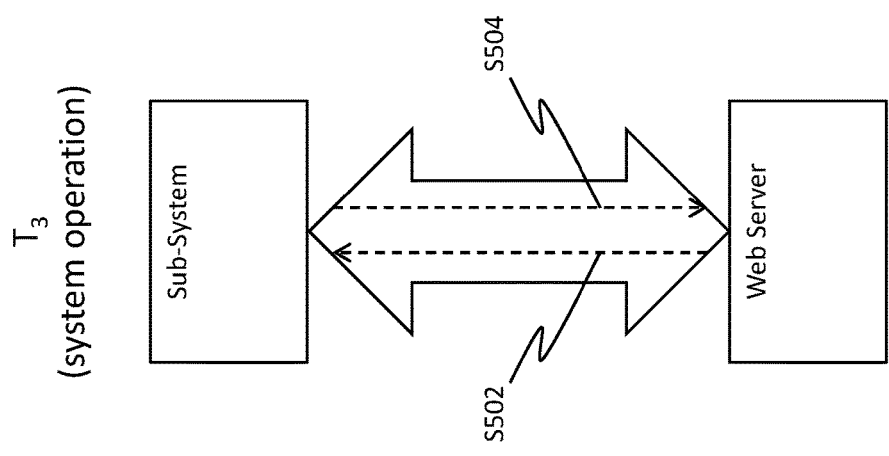

Signed First Processing Verification Data Packet 902

First Data Payload 904

Sub-System 1 Digital Signature 906

FIG. 9A

Signed Second Processing Verification Data Packet 912

Second Data Payload 914

Sub-System 2 Digital Signature 916

FIG. 9B

Signed Second Processing Verification Data Packet 922

Second Data Payload 914

Sub-System 1 Digital Signature 906
Sub-System 2 Digital Signature 916

FIG. 9C

Processing Verification Data
Payload (Ledger hold) 1002

Ledger hold ID 1004
Account ID 1006
Amount 1008
Reason for hold 1010
Parent hold 1012

FIG. 10A

Processing Verification Data
Payload (Withdrawal Allowed)
1022

Account ID 1024
Amount 1026

FIG. 10B

Processing Verification Data
Payload (Fiat Currency
Withdrawn) 1032

Account ID 1034
Amount 1036
Bank Account ID 1038

FIG. 10C

Processing Verification Data
Payload (Digital Assets
Withdrawn) 1042

Account ID 1044
Amount 1046
Address 1048

FIG. 10D

Processing Verification Data
Payload (Fiat Currency
Deposited) 1052

Account ID 1054
Amount 1056

FIG. 10E

Processing Verification Data
Payload (Digital Assets
Deposited) 1062

Account ID 1064
Amount 1066

FIG. 10F

AUTHENTICATING A USER DEVICE ASSOCIATED WITH A USER TO COMMUNICATE VIA A WIRELESS NETWORK IN A SECURE WEB-BASED ENVIRONMENT

CROSS-REFERENCE TO RELATED APPLICATIONS

The present application is a continuation of and claims priority to U.S. application Ser. No. 16/947,667, entitled "AUTHENTICATING A USER DEVICE ASSOCIATED WITH A USER TO COMMUNICATE VIA A WIRELESS NETWORK IN A SECURE WEB-BASED ENVIRONMENT," filed on Aug. 12, 2020, which will issue as U.S. Pat. No. 11,283,797 on Mar. 22, 2022, which is a continuation of and claims priority to U.S. application Ser. No. 16/589,679, entitled "AUTHENTICATING A USER DEVICE ASSOCIATED WITH A USER TO COMMUNICATE VIA A WIRELESS NETWORK IN A SECURE WEB-BASED ENVIRONMENT," filed on Oct. 1, 2019, now known as U.S. Pat. No. 10,778,682, which issued on Sep. 15, 2020, which is a continuation of and claims priority to U.S. patent Application Ser. No. 16/028,124, entitled "AUTHENTICATING A USER DEVICE ASSOCIATED WITH A USER TO COMMUNICATE VIA A WIRELESS NETWORK IN A SECURE WEB-BASED ENVIRONMENT," filed on Jul. 5, 2018, now U.S. Pat. No. 10,484,376, which is a continuation of and claims priority to U.S. patent application Ser. No. 15/906,898, entitled "SYSTEM, METHOD, AND PROGRAM PRODUCT FOR PROCESSING SECURE TRANSACTIONS WITHIN A CLOUD COMPUTING SYSTEM," filed on Feb. 27, 2018, now U.S. Pat. No. 10,063,548, which is a continuation of U.S. patent Application Ser. No. 15/818,134, entitled "SYSTEM, METHOD, AND PROGRAM PRODUCT FOR PROCESSING SECURE TRANSACTIONS WITHIN A CLOUD COMPUTING SYSTEM," filed on Nov. 20, 2017, now U.S. Pat. No. 9,942,231, which is a continuation of U.S. patent application Ser. No. 15/006,971, entitled "SYSTEM, METHOD, AND PROGRAM PRODUCT FOR PROCESSING SECURE TRANSACTIONS WITHIN A CLOUD COMPUTING SYSTEM," filed on Jan. 26, 2016, now U.S. Pat. No. 9,853,977, which in turn claims the benefit of and priority to U.S. Provisional Patent Application Ser. No. 62/107,726, entitled "SYSTEM, METHOD, AND PROGRAM PRODUCT FOR PROCESSING SECURE TRANSACTIONS WITHIN A CLOUD COMPUTING SYSTEM," filed on Jan. 26, 2015, and the contents of these applications are incorporated herein by reference in their entirety.

FIELD OF INVENTION

The present invention generally relates to particular systems, methods, and program products for web-based security systems for user authentication and processing in a distributed computing environment.

SUMMARY OF INVENTION

Particular systems, methods, and program products for web-based security for user authentication and processing in a distributed computing environment are disclosed.

In embodiments, user authentication processes may entail generation and transmission of an identity provider data packet to track user access authorization in a distributed computing system.

In embodiments, a secure data packet provided by an identity provider sub-system may be passed throughout a distributed computing system to provide information, such as user authentication information to various system components or sub-systems. In embodiments, such a secure data packet may comprise an HTTP cookie or web cookie, which may be encrypted.

In embodiments, a verification data packet, generated and/or modified by one or more processing sub-systems, may be passed among sub-systems to certify the authenticity of data, including electronic requests, received from other sub-systems of a distributed computing system.

In embodiments, a method of authenticating a user and/or a user session may comprise receiving, at a web server of a computing system from a user device, an electronic login request comprising user credentials; transmitting, from the web server to an identity provider sub-system of the computing system, the user credentials for verification based at least in part upon reference user credentials stored in non-transitory computer-readable memory, wherein the identity provider is configured to authenticate user sessions; receiving, at the web server from the identity provider sub-system, a first signed identity provider data packet having a first payload comprising first login credential verification information, a first timestamp, a session identifier, and a first identity provider sub-system digital signature, wherein the first signed identity provider data packet provides an indication that the user session is authenticated and wherein the first identity provider sub-system digital signature is generated by generating a hash of the first payload and encrypting the hash using a first identity provider sub-system private key; generating, by the web server, first display data; transmitting, from the web server to the user device, the first signed identity provider data packet; and transmitting, from the web server to the user device, the first display data.

The method may further comprise receiving, at the web server from the user device, the first signed identity provider data packet; receiving, at the web server from the user device, a user data packet requiring processing by the computing system; transmitting, from the web server to a processing sub-system of the computing system, an electronic request for processing based at least in part upon the user data packet; transmitting, from the web server to a processing sub-system, the first signed identity provider data packet so that the processing sub-system can verify that the user session is authenticated; receiving, at the web server from the processing sub-system, first processed data; transmitting, from the web server to the identity provider sub-system, the first signed identity provider data packet along with an electronic request to update the first signed identity provider data packet; receiving, at the web server from the identity provider sub-system, a second signed identity provider data packet having a second payload comprising the first login credential verification information, a second timestamp, the session identifier, and a second identity provider sub-system digital signature, wherein the second signed identity provider data packet provides an updated indication that the user session remains authenticated and wherein the second identity provider sub-system digital signature is generated by generating a hash of the second payload and encrypting the hash using the first identity provider sub-system private key; generating, by the web server, second display data based at least in part upon the first processed data; transmitting, from the web server to the user device, the second signed identity provider data packet; and transmitting, from the web server to the user device, the second display data.

In embodiments, the first signed identity provider data packet may be an HTTP cookie. In embodiments, the first signed identity provider data packet may be encrypted prior to transmission to the user device and/or may be transmitted via an encrypted communication.

In embodiments, the method may further comprise, after receiving the first signed identity provider data packet, the step of verifying, by the web server, the authenticity of the first signed identity provider data packet by decrypting the first signed identity provider data packet using a public key corresponding via asymmetric key cryptography to the identity provider sub-system private key.

In embodiments, the first signed identity provider data packet may be used by the processing sub-system to verify that the user session is authenticated by determining that the user credentials were authenticated and determining, based at least in part upon the first timestamp, that the user session has not timed out.

In embodiments, the first display data may comprise machine-readable instructions to render a graphical user interface for inputting user multi-factor authentication data. In embodiments, the method may further comprise, e.g., prior to receiving a user data packet requiring processing by the computing system, the steps of receiving, at the web server from the user device, user multi-factor authentication data and the first signed identity provider data packet; transmitting, from the web server to the identity provider sub-system, the user multi-factor authentication data; receiving, at the web server from the identity provider sub-system, a third signed identity provider data packet comprising second login credential verification information including multi-factor authentication information, a third timestamp, the session identifier, and a third identity provider sub-system digital signature; generating, by the web server, third display data; transmitting, from the web server to the user device, the third signed identity provider data packet; and transmitting, from the web server to the user device, the third display data.

In embodiments, a method of authenticated computing may comprise receiving, at a first sub-system of a computing system from an origination sub-system, at least a first portion of a first electronic processing request; executing, by the first sub-system, first computing operations to satisfy the first portion of the first electronic processing request to generate a first sub-processing output; configuring, by the first sub-system, a first processing verification data packet comprising a first payload comprising a first timestamp and the first sub-processing output; generating, by the first sub-system, a signed first processing verification data packet by generating a hash of the first payload and encrypting the hash using a first sub-system private key; generating, by the first sub-system, a second electronic processing request associated with a second portion of the first electronic processing request; and transmitting, from the first sub-system to a second sub-system of the computing system, the second electronic processing request along with the signed first processing verification data packet.

The method may further comprise verifying, by the second sub-system, the authenticity of the signed first processing verification data packet by decrypting the signed first processing verification data packet using a public key corresponding via asymmetric key cryptography to the first sub-system private key; executing, by the second sub-system, second computing operations to satisfy the second electronic processing request to generate a second sub-processing output; configuring, by the second sub-system, a second processing verification data packet comprising a second payload comprising a second timestamp, the first sub-processing output, and the second sub-processing output; generating, by the second sub-system, a signed second processing verification data packet by generating a hash of the second payload and encrypting the hash using a second sub-system private key; and transmitting, from the second sub-system to a third sub-system of the computing system, the signed second processing verification data packet.

In embodiments, the origination sub-system may be a web server. In embodiments, the third sub-system may be the origination sub-system.

In embodiments, receiving at least a first portion of a first electronic processing request may further comprise receiving a first signed identity provider data packet, digitally signed using an identify provider private key by an identity provider sub-system that authenticated the user session. In embodiments, the method may further comprise verifying, by the first sub-system, the authenticity of the first signed identity provider data packet by decrypting the first signed identity provider data packet using a public key corresponding via asymmetric key cryptography to the identity provider private key.

In embodiments, the signed second processing verification data packet may comprise respective digital signatures of the first sub-system and the second sub-system. In embodiments, digital signatures from a plurality of sub-systems that processed some of the data in a data packet payload may be appended to that data packet. In embodiments, digital signatures may comprise alphanumeric sequences generated using a respective private key.

In embodiments, a computing system may comprise a web server comprising one or more computers; an identity provider sub-system; and non-transitory computer-readable memory comprising one or more memory devices, e.g., operatively connected to the web server and to the identity provider sub-system, wherein the system is programmed to authenticate users by: receiving, at a web server of the computing system from a user device, an electronic login request comprising user credentials; transmitting, from the web server to an identity provider sub-system of the computing system, the user credentials for verification based at least in part upon reference user credentials stored in non-transitory computer-readable memory, wherein the identity provider is configured to authenticate user sessions; receiving, at the web server from the identity provider sub-system, a first signed identity provider data packet having a first payload comprising first login credential verification information, a first timestamp, a session identifier, and a first identity provider sub-system digital signature, wherein the first signed identity provider data packet provides an indication that the user session is authenticated and wherein the first identity provider sub-system digital signature is generated by generating a hash of the first payload and encrypting the hash using a first identity provider sub-system private key; generating, by the web server, first display data; transmitting, from the web server to the user device, the first signed identity provider data packet; and transmitting, from the web server to the user device, the first display data.

The system may further be programmed to perform the steps of receiving, at the web server from the user device, the first signed identity provider data packet; receiving, at the web server from the user device, a user data packet requiring processing by the computing system; transmitting, from the web server to a processing sub-system of the computing system, an electronic request for processing based at least in part upon the user data packet; transmitting, from the web server to a processing sub-system, the first signed identity provider data packet so that the processing sub-system can verify that the user session is authenticated; receiving, at the web server from the processing sub-system, first processed data; transmitting, from the web server to the identity provider sub-system, the first signed identity provider data packet along with an electronic request to update the first signed identity provider data packet; receiving, at the web server from the identity provider sub-system, a second signed identity provider data packet having a second payload comprising the first login credential verification information, a second timestamp, the session identifier, and a second identity provider sub-system digital signature, wherein the second signed identity provider data packet provides an updated indication that the user session remains authenticated and wherein the second identity provider sub-system digital signature is generated by generating a hash of the second payload and encrypting the hash using the first identity provider sub-system private key; generating, by the web server, second display data based at least in part upon the first processed data; transmitting, from the web server to the user device, the second signed identity provider data packet; and transmitting, from the web server to the user device, the second display data.

In embodiments, a computing system may comprise one or more processors and non-transitory computer-readable memory having stored thereon instructions to perform the steps of receiving, at a first sub-system of the computing system from an origination sub-system, at least a first portion of a first electronic processing request; executing, by the first sub-system, first computing operations to satisfy the first portion of the first electronic processing request to generate a first sub-processing output; configuring, by the first sub-system, a first processing verification data packet comprising a first payload comprising a first timestamp and the first sub-processing output; generating, by the first sub-system, a signed first processing verification data packet by generating a hash of the first payload and encrypting the hash using a first sub-system private key; generating, by the first sub-system, a second electronic processing request associated with a second portion of the first electronic processing request; and transmitting, from the first sub-system to a second sub-system of the computing system, the second electronic processing request along with the signed first processing verification data packet.

The computer-readable memory may further have stored thereon instructions to perform the steps of verifying, by the second sub-system, the authenticity of the signed first processing verification data packet by decrypting the signed first processing verification data packet using a public key corresponding via asymmetric key cryptography to the first sub-system private key; executing, by the second sub-system, second computing operations to satisfy the second electronic processing request to generate a second sub-processing output; configuring, by the second sub-system, a second processing verification data packet comprising a second payload comprising a second timestamp, the first sub-processing output, and the second sub-processing output; generating, by the second sub-system, a signed second processing verification data packet by generating a hash of the second payload and encrypting the hash using a second sub-system private key; and transmitting, from the second sub-system to a third sub-system of the computing system, the signed second processing verification data packet.

In embodiments, program products may be provided to facilitate the secure authentication operations of the present invention. Accordingly, software and/or software libraries, may be provided for implementation in computing systems, such as distributed computing systems, to perform the processes described herein.

BRIEF DESCRIPTION OF THE DRAWINGS

Exemplary embodiments of the present invention will be described with references to the accompanying figures, wherein:

FIGS. 3A-C are schematic diagrams of communications between an electronic user device and a web server in accordance with exemplary embodiments of the present invention;

FIGS. 4A-C are schematic diagrams of communications between a web server and an identity provider sub-system in accordance with exemplary embodiments of the present invention;

FIG. 5 is a schematic diagram of communications between a web server and a sub-system in accordance with exemplary embodiments of the present invention;

FIGS. 9A-C are schematic diagrams of an exemplary processing verification data packets in accordance with exemplary embodiments of the present invention; and FIGS. 10A-F are schematic diagrams of an exemplary processing verification data payloads in accordance with exemplary embodiments of the present invention.

DETAILED DESCRIPTION OF THE INVENTION

The present invention generally relates to particular systems, methods, and program products for web-based security for user authentication and processing in a distributed computing environment.

The present invention is an improvement to computer security technology. Computer systems to date have been susceptible to attack, whether the introduction of malicious code or the unauthorized access of information, over external data connections, such as the Internet. As computing systems increasingly move to distributed computing architectures, such as cloud computing, external data connections are often necessary to the functioning of the computing system. However, those same external data connections provide opportunity for attack. The present invention provides novel systems, methods, and program products to provide security in computing systems. The present invention can provide verification that a user is authorized or that a user session is authorized, such as having valid user credentials and the session not having timed out. The authenticity of any client request received from a user device, or configured to appear as if it originated from a user device, can be confirmed by the computing system. In other embodiments, communications among sub-systems of a computing system can be verified using the trust chain verified computing methods of the present invention.

A secure data packet may be passed throughout a distributed computing system to provide information, such as authentication information to various system components or sub-systems. In embodiments, such a secure data packet may comprise an HTTP cookie or web cookie, which may be encrypted. Cookies may be persistent client state objects with a unique identifier. In embodiments, the data packet itself may not be encrypted, but may be transmitted using secure transmission such as a Secure Sockets Layer (SSL). The secure data packet may be secured using public key cryptography, also known as asymmetric cryptography. Accordingly, one or more computing systems or sub-systems may sign the data packet using a private key. Other computing systems or sub-systems may verify the signature using a public key to authenticate the data packet, as described herein. In embodiments, the public key may be transmitted along with a signed data packet.

Figure 1A:
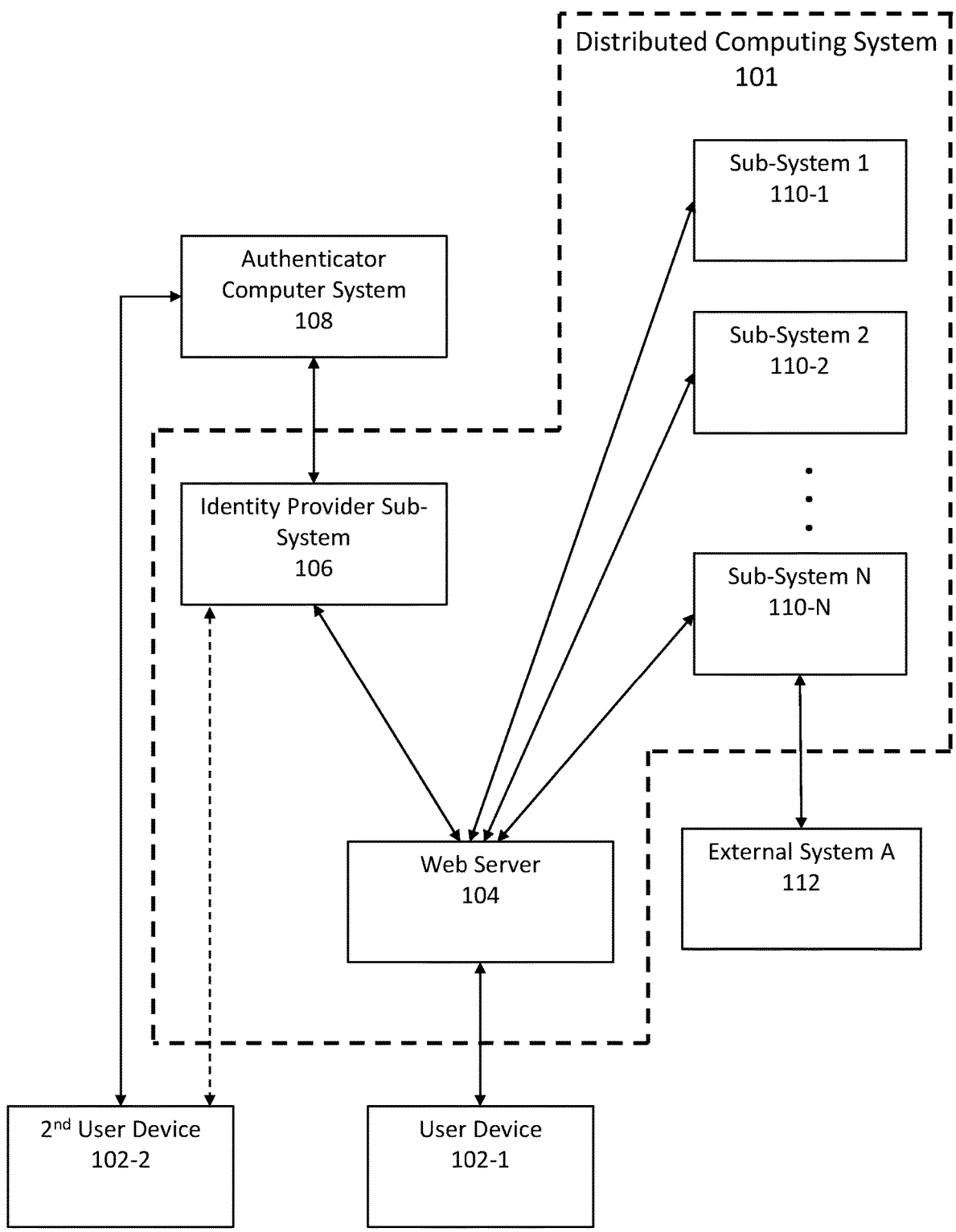
FIGS. 1A-C are schematic diagrams of system components in accordance with exemplary embodiments of the present invention.

FIG. 1A illustrates components in a system for secure, authenticated distributed computing. Such a system can include a distributed computing system 101, which in turn can include a web server 104, an identity provider sub-system 106, and/or one or more sub-systems 110 (e.g., sub-system 1 110-1, sub-system 2 110-2, . . . , sub-system N 110-N), which may be processing sub-systems configured to perform one or more computing processes. In embodiments, the distributed computing system 101 may include an authenticator sub-system. In other embodiments, authentication functions may be performed by a separate computer system, as described herein with respect to an authenticator computer system 108.

The distributed computing system 101 may be operatively connected to a user device 102-1. In embodiments, the distributed computing system 101 may connect to one or more user devices 102. In embodiments, the web server 104 or another data server may handle communications between the distributed computing system 101 and the user device 102. In embodiments, the distributed computing system 101 may be operatively connected to the authenticator computer system 108, which may be a third-party computer system, as shown in FIG. 1A. For convenience, the authenticator computer system 108 and the authenticator sub-system are described herein with respect to the authenticator computer system 108, although either component may perform the processes described herein. The authenticator computer system 108 may be operatively connected to a second user device 102-2, where both the user device 102-1 and the second user device 102-2 may be associated with a single user and/or user account or groups of accounts (e.g., a master account with sub-accounts for individual users). In embodiments, the first user device 102-1 and the second user device 102-2 may be the same physical device accessing different user accounts or using different communications technology, such as accessing the web server through web-based HTTP requests on one hand and on the other hand communicating with the authenticator computer system 108 via text message (SMS) or cellular phone call, to name a few. The distributed computing system 101 may also communicate with one or more external systems 112, which may be computer systems comprising one or more computers. In embodiments, a sub-system 110 may be operatively connected to an external system 112, e.g., to obtain data (e.g., receive data and/or fetch data) and/or to transmit data.

The components in a system for secure, authenticated distributed computing may comprise one or more computers. The components may have one or more processors and non-transitory computer-readable memory, such as external and/or internal hard drives and/or disk drives. The components may further include data stored in one or more databases in the non-transitory computer-readable memory and one or more software modules stored in the non-transitory computer-readable memory and running or configured to run on the one or more processors. The components may include input devices (e.g., keyboards, mice, touchscreens, microphones, cameras) and/or output devices (e.g., display devices, speakers).

The components of a system for secure, authenticated distributed computing may be operatively connected directly, such as via wired or wireless communications, and/or indirectly, such as via a data network, such as the Internet, a telephone network, a mobile broadband network (e.g., a cellular data network), a mesh network, a local area network (LAN) (including a wireless local area network, e.g., a Wi-Fi network), a wide area network (WAN), a metropolitan area network (MAN), and/or a global area network (GAN), to name a few. Data networks may be provided via wired and/or wireless connections. In embodiments, any combination of communications channels may be utilized by the system components. The system components may each include one or more communications portals, which may handle, process, support, and/or perform wired and/or wireless communications, such as transmitting and/or receiving data (e.g., data packets). In embodiments, transmission described with respect to a single data packet may comprise a plurality of data packets. Data packets may be discrete electronic units of data. In other embodiments, transmissions may comprise non-discrete signals, such as data streams. Transmissions described with respect to data packets may also comprise data transmissions via other communications mechanisms known in the art, such as data streams. Communications portals can comprise hardware (e.g., hardware for wired and/or wireless connections, such as communications chipsets, communications interfaces, and/or communications antennas, to name a few) and/or software.

Wired connections may be adapted for use with cable, plain old telephone service (POTS) (telephone), fiber (such as Hybrid Fiber Coaxial), xDSL, to name a few, and wired connections may use coaxial cable, fiber, copper wire (such as twisted pair copper wire), and/or combinations thereof, to name a few. Wired connections may be provided through telephone ports, Ethernet ports, USB ports, and/or other data ports, such as Apple 30-pin connector ports or Apple Lightning connector ports, to name a few. Wireless connections may include cellular or cellular data connections and protocols (e.g., digital cellular, PCS, CDPD, GPRS, EDGE, CDMA2000, 1×RTT, Ev-DO, HSPA, UMTS, 3G, 4G, and/or LTE, to name a few), Bluetooth, Bluetooth Low Energy, Wi-Fi, radio, satellite, infrared connections, ZigBee communication protocols, to name a few. Communications interface hardware and/or software, which may be used to communicate over wired and/or wireless connections, may comprise Ethernet interfaces (e.g., supporting a TCP/IP stack), X.25 interfaces, T1 interfaces, and/or antennas, to name a few.

Referring to the exemplary distributed computing system 101, the functions described herein with respect to each sub-system may be performed by one or more other sub-systems. Each sub-system may be separate computer system comprising one or more computers. In embodiments, one or more sub-systems may share any of the same hardware (e.g., the same processors, computer-readable memory, and/or communications portals, to name a few). Accordingly, while described herein with respect to distributed cloud computing architectures, the security systems of the present invention may be implemented by a single computer having multiple logical components (e.g., one or more software modules for performing various computing processes, an identity provider module, to name a few) and/or multiple memory components (e.g., a plurality of computer-readable memory devices or a plurality of databases stored on computer-readable memory). In other embodiments, the security systems of the present invention may be implemented by a network of directly connected computers. Security may be maintained so long as a cryptographic private key of each sub-system remains uncompromised. In other embodiments, sub-systems may be distributed in a cloud computing architecture, which may utilize one or more servers. Each sub-system or each module may be operatively connected to non-transitory computer-readable memory having stored thereon machine-readable processing instructions for the respective sub-system or module. In embodiments, such memory may be different computer-readable memory. In other embodiments, the memory may be the same, e.g., stored on the same one or more memory devices, which may be accessed at a common address. In embodiments, the computer-readable memory may further have stored thereon one or more databases containing data pertaining to the system (e.g., data obtained by the system (transmitted to, uploaded to, received by and/or fetched by, to name a few) and/or data generated by the system).

The web server 104 may provide display data to one or more user device 102, e.g., user device 102-1. Display data may comprise website content (e.g., HTML, JavaScript, and/or other data from which a user device can generate and/or render one or more webpages) and/or application content, such as mobile application content, to be used in generating or providing display content for one or more software applications (e.g., an installed application such as executable software or mobile apps configured to generate viewer interfaces). In embodiments, a web browser configured to render web pages may render one or more interfaces, such as graphical user interfaces, based upon the display data. In embodiments, the web server 104 may authenticate a user account by verifying received user credentials, such as a received username and password combination. The web server 104 may transmit data packets such as HTTP or web cookies to user devices 102. Such a data packet may be an identity provider (IDP) data packet, which may contain security data comprising user verification information, such as login credential verification information, 2-factor authentication verification information, session duration information, to name a few. In embodiments, the web server 104 may generate an IDP web cookie from an IDP data packet. The web server 104 may receive data from the user devices 102, such as electronic requests, user input data, and/or an IDP data packet that was transmitted to and stored by the user device 102.

The identity provider sub-system 106 may comprise one or more computers. It may verify user credentials, verify that a user session has not expired (e.g., that a predefined session duration or threshold period of inactivity has not been exceeded), verify that a request originated from an authorized user (e.g., an authorized and individual user whose identity has been verified, an authorized user account having valid credentials, and/or an authorized user device, which may be a pre-registered device), and/or may provide such verifications to other system components. Accordingly, the identity provider sub-system 106 may generate and/or update a secure data packet (an IDP data packet or authorization data packet) comprising a payload of authorization information. In embodiments, such a data packet may be a web cookie. The identity provider sub-system 106 may sign the payload of the data packet using an identity provider private key in order to secure the data packet using public key cryptography. Other system components may use a corresponding public key to verify the signature of the identity provider sub-system 106 and/or to read the data packet payload. The other system components may be programmed to verify the IDP data packet before processing requests originating from a user or user device.

In embodiments, the identity provider sub-system 106 may perform authentication processes as described herein with respect to the authenticator computer system 108. The authenticator computer system 108 may authenticate a user's identity, e.g., using multi-factor authentication such as two-factor authentication (2FA), as is known in the art. For example, the authenticator computer system 108 may receive an electronic second authentication request from a distributed computing system 101 and/or from the web-server 104 or the identity provider sub-system 106, e.g., following a login request, such as submission of a username (e.g., a unique alphanumeric identifier or an email address, to name a few) and password, from a first user device 102-1. The electronic second authentication request may comprise a user identification, such as a user account identifier (e.g., an alphanumeric text string). In embodiments, the electronic second authentication request may comprise time information indicating a time of the request. In embodiments, the authenticator computer system 108 may generate a token, which may be an alphanumeric text string, and transmit the token to a second user device 102-2. The token may be input and/or transmitted from the first user device 102-1 to the web server 104, which may confirm the validity of the token. In embodiments, a different sub-system of the distributed computing system 101 may confirm the validity of the token, which may entail transmitting the received token to the authenticator computer system 108 and receiving an electronic indication of token validity. Accordingly, the authenticator computer system 108 may determine token validity.

In embodiments, a token may be generated at a user device instead of generated remotely and transmitted to a second user device. Accordingly, both the authenticator computer system 108 and the user device 102-1 may store a secret seed, from which the authenticator computer system 108 and the user device 102-1 can generate a token, e.g., using a Time-based One-time Password algorithm (TOTP), which can generate tokens based on the secret seed and current time. Such a token may be transmitted from the first user device 102-1 to the web server 104 for verification (either by the web server 104, another sub-system, or the authenticator computer system 108) instead of requiring a second user device 102-2 to receive and then transmit a token. In embodiments, the authenticator computer system 108 may store a public key associated with a user private key, where the public and private keys (e.g., RSA keys) may comprise a cryptographic key pair for public key cryptography. The user private key may be stored on the user device 102-1. The keys may be used to encrypt transfers of a secret seed, e.g., to provide a user device 102-1 with a new secret seed. In other embodiments, a physical device may be programmed to generate a token for the user device 102-1 to provide to the web server 104.

User devices 102 may be computers, tablet computers, wearable computers, mobile phones, smart phones, PDAs, remote controls, or other user electronic devices configured to receive, display, and/or transmit data. User devices 102 may be associated with phone numbers (e.g., capable of receiving SMS messages). In embodiments, user devices 102 may be configured to receive email for a user email account. In embodiments, user devices 102 may include a web browser, mobile application, downloadable desktop application, and/or other program product for communicating via a data network such as the Internet and/or communicating with a web server 104. User devices may generate and/or update one or more graphical user interfaces with display content received from a server. Such display content may be based upon machine-readable instructions received from the server that may comprise display content data, action handling instructions, layout instructions, and/or other styling instructions, to name a few.

An external system 112 may be a computer system that communicates with a distributed computing system 101 to provide or obtain information.

Figure 1B:
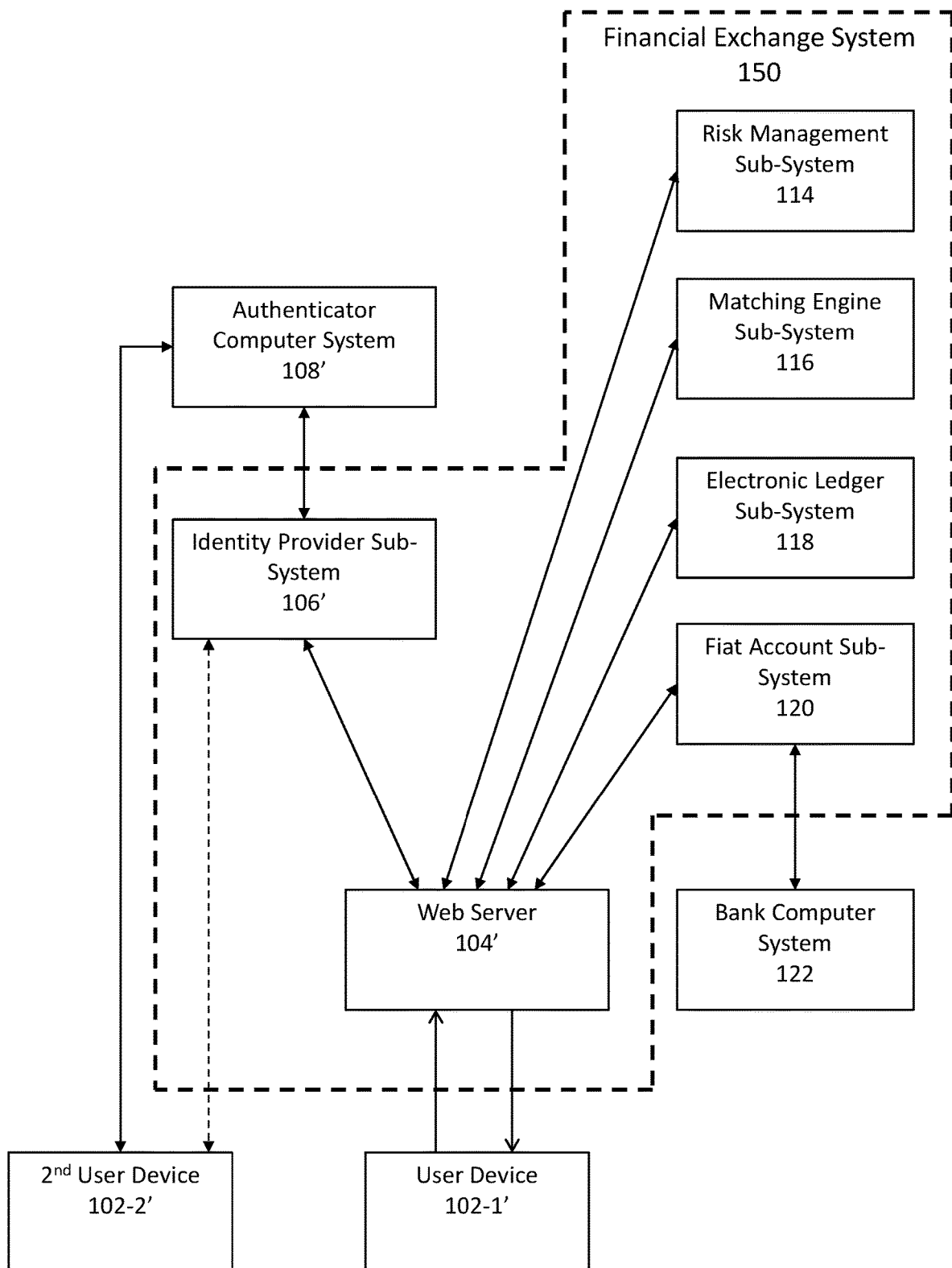

FIG. 1B illustrates components for secure, authenticated distributed computing in an exemplary financial exchange system. The system components can include the hardware and/or software described with respect to FIG. 1A. Also as described with respect to FIG. 1A, the system can include a web server 104', an identity provider sub-system 106', an authenticator computer system 108', and/or one or more user devices (e.g., 102-1, 102-2), which user devices may be computer systems (e.g., institutional investor computer systems). A distributed financial exchange computer system 150 can include the web server 104', identity provider sub-system 106', and one or more processing sub-systems, such as a risk management sub-system 114, a matching engine sub-system 116, and electronic ledger sub-system 118, and/or a fiat account sub-system 120. The financial exchange computer system 150 may communicate with one or more external computer systems, such as bank computer systems 122 and/or index computer systems.

A risk management sub-system 114 may perform processes to detect fraudulent transactions and/or security breaches. Such a sub-system may monitor access data describing access of the exchange (e.g., IP addresses, accounts, times of access, to name a few), monitor trading data, analyze trading data, determine patterns, determine anomalies, and/or determine violations of pre-programmed security rules, to name a few. A matching engine sub-system 116 may match buy orders with sell orders, receive orders, and/or update an electronic order book, to name a few. An electronic ledger sub-system 118 may track and/or store account balances, update account balances, compute account balances, report account balances, and/or place holds on account funds while transactions are in progress (e.g., set an account hold indicator), to name a few. A fiat account sub-system 120 may allocate funds among accounts, track funds, store funds, and/or transfer funds, to name a few. The fiat account sub-system 120 may manage omnibus or pooled accounts for holding customer funds. The fiat account sub-system 120 may process receipts of funds, e.g., from a bank, via a wire transfer, via a credit card or ACH transfer, and/or via check, to name a few. Accordingly, the fiat account sub-system 120 may communicate with one or more external systems, such as a bank computer system 122.

Figure 1C:
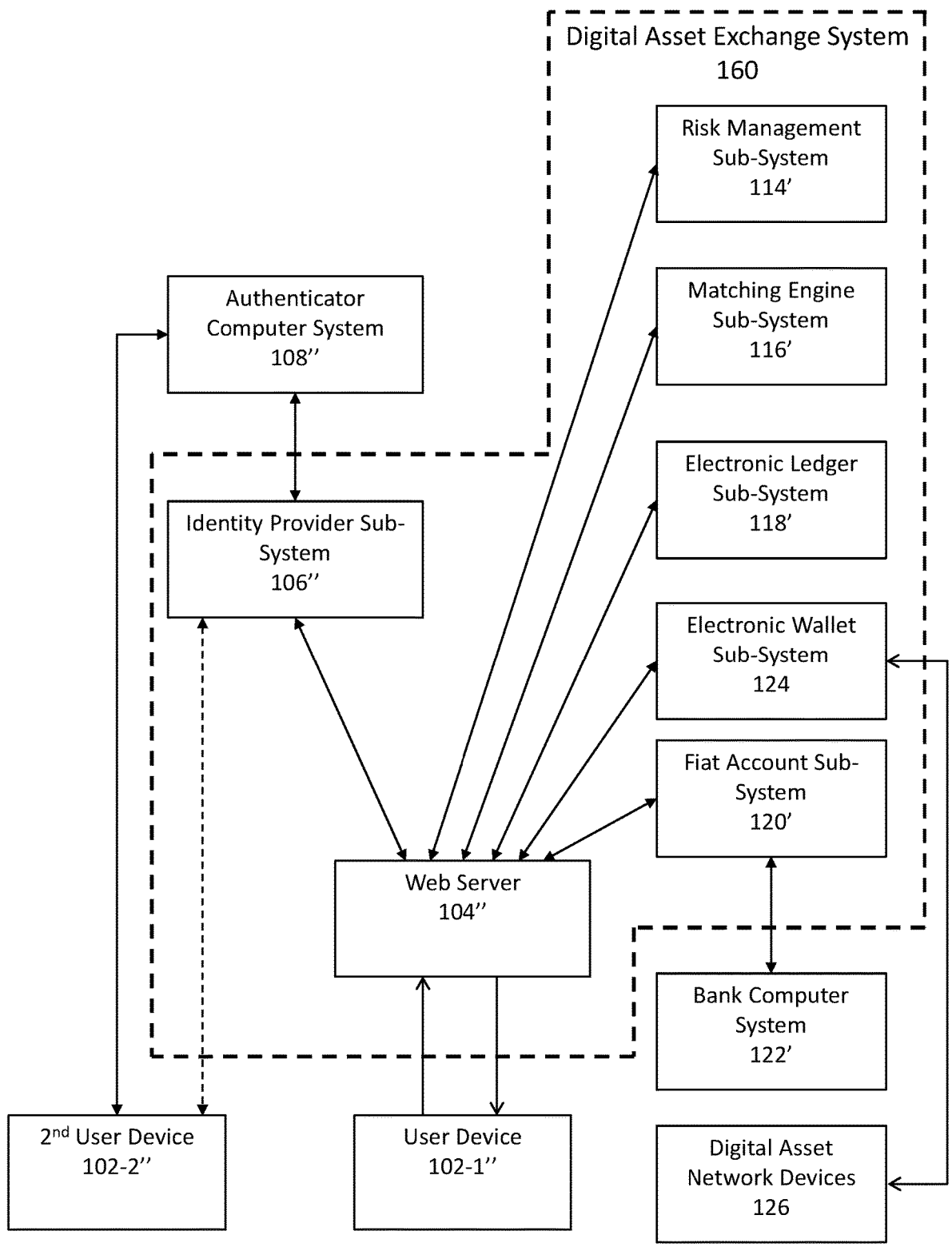

FIG. 1C illustrates components for secure, authenticated distributed computing in an exemplary digital asset exchange system. The system components can include the hardware and/or software described with respect to FIG. 1A. The system may also include components as described with respect to FIGS. 1A and 1B. Accordingly, a digital asset exchange system 160 can include a web server 104", an identity provider sub-system 106", and an authenticator computer system 108". The system may also communicate with user devices 102-1 and 102-1 and/or one or more external systems, such as a bank computer system 122' and/or digital asset network devices 126. Digital asset network devices 126 can include user devices running a digital asset network client (e.g., specific software configured to create a digital asset network), a digital asset network ledger, which may be centralized or decentralized (e.g., distributed via a digital asset network client, as with the Bitcoin Blockchain).

As with the financial exchange system 150 of FIG. 1B, the digital asset exchange system 160 of FIG. 1C can include a risk management sub-system 114', a matching engine sub-system 116', an electronic ledger sub-system 118', and a fiat account sub-system 120'. The electronic ledger sub-system 118' may track both fiat funds and digital assets associated with a plurality of users and/or user accounts and/or may perform other processes as described with respect to sub-system 118 of FIG. 1B, for fiat funds and/or digital assets. The digital asset exchange system 160 can also include an electronic wallet sub-system 124, which may process receipts of digital assets, storage of digital assets, pooled storage of digital assets, digital asset storage security, and/or transfers of digital assets, to name a few.

Figure 2A:
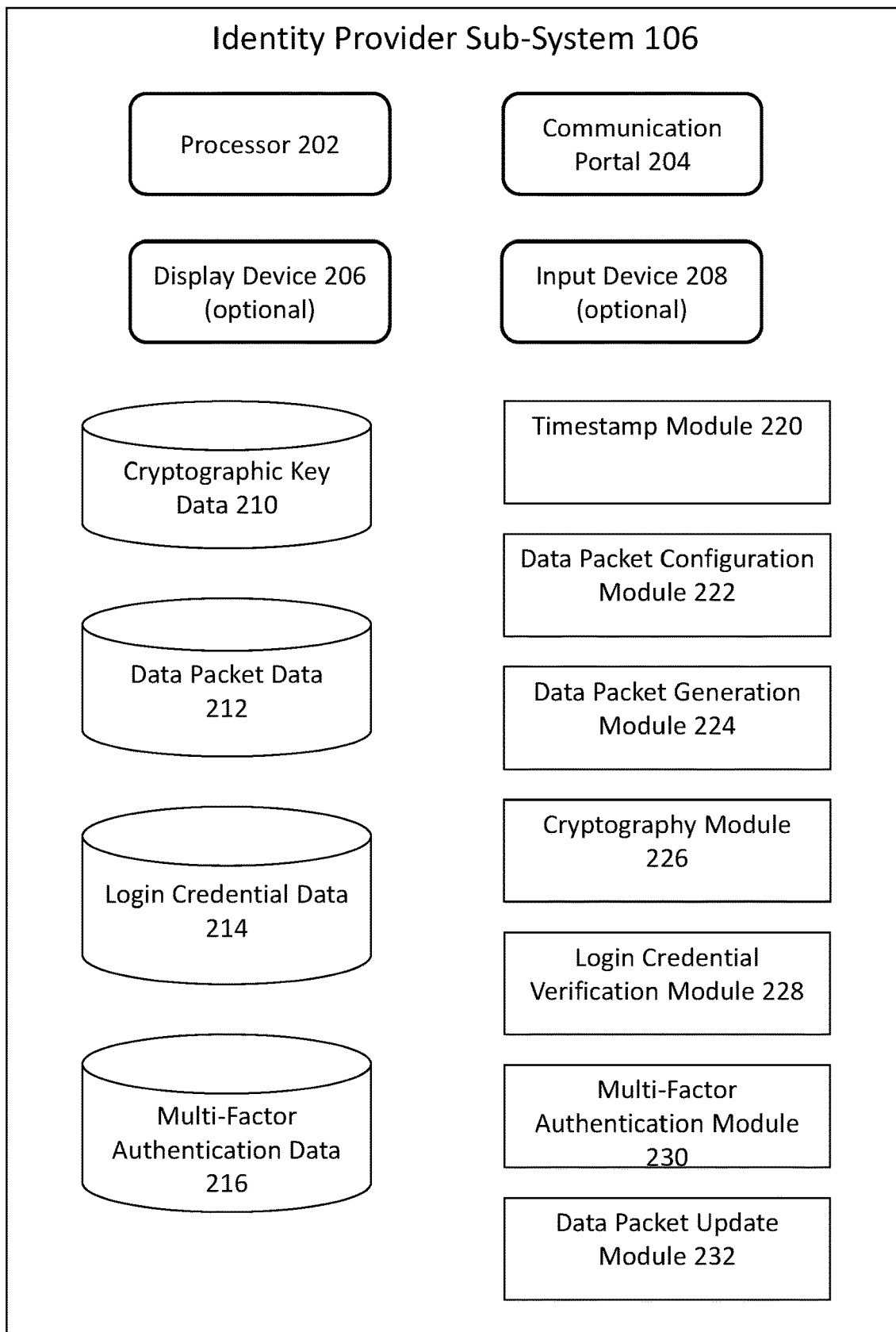
FIG. 2A is a schematic diagram of an identity provider computer sub-system in accordance with exemplary embodiments of the present invention.

FIG. 2A is a schematic diagram of an exemplary identity provider sub-system 106. The sub-system 106 may comprise one or more processors 202 and a communication portal 204, as described with respect to FIG. 1A. The identity provider sub-system 106 may also include one or more display device 206 and/or input device 208. Sub-system 106 can include non-transitory computer-readable memory, which may comprise one or more database. Data stored in the memory can include cryptographic key data 210, data packet data 212, login credential data 214, and/or multi-factor authentication data 216, to name a few. Sub-system 106 can comprise one or more software modules stored in the memory and running or configured to run on the one or more processors 202. Such modules can include a timestamp module 220, data packet configuration module 222, data packet generation module 224, cryptography module 226, login credential verification module 228, multi-factor authentication module 230, and/or data packet update module 232, to name a few. The functions described herein with respect to each module may be performed by one or more other modules (e.g., additional modules and/or consolidated with other modules described herein).

Cryptographic key data 210 may include cryptographic key pairs, such as a private key and/or a corresponding public key. Such keys may be RSA keys. The private key may be used to sign data packets. In embodiments, the public key may be provided to other sub-systems, which can use the public key to read and/or verify the contents of data packets signed by the identity provider sub-system 106 using its private key.

Data packet data 212 can include data packet payload data. Payload data can include user identifiers, account identifiers (e.g., indicating a user account or parent account associated with a request, such as an access request, a data request, or a transaction request received from a user device 102), and/or session identifiers (e.g., unique identifiers such as alphanumeric sequences assigned to particular user sessions). Payload data can also include timestamp information, which may correspond to a time at which a data packet was generated, configured, signed, and/or modified, or a time at which a user request was received, to name a few. Payload data can include authentication information, which may indicate the status of user credential verification processes and/or two-factor authentication processes. In embodiments, the identity provider sub-system 106 may maintain (e.g., store and/or update) a log of electronic requests (e.g., IDP data packet generation requests, IDP data packet update requests, user login requests, to name a few) and/or a log of data packet creations, updates, and/or expirations, to name a few.

Login credential data 214 may comprise a username and/or password. A username may be an alphanumeric text sequence, an email address, and/or a phone number, to name a few. In embodiments, login credential data 214 may be used to verify login credentials received from a user device 102.

Multi-factor authentication data 216 may comprise user account identifiers and/or user identifiers, authentication tokens, and/or secret seeds used to generate and/or verify authentication tokens. In embodiments, multi-factor authentication data 216 may comprise two-factor authentication data. Multi-factor authentication data 216 may include user biometric data (e.g., voice samples), photographs, and/or electronic copies, scans, images of government-issued identification or identification issued by other organizations, and/or security questions, to name a few.

The identity provider sub-system 106 may be programed to verify user authorization to access a website or data from a data network (e.g., using a downloadable mobile application). Verifying authorization can comprise verifying user credentials, verifying multi-factor authentication, verifying that a user session has not expired (e.g., not exceeded a threshold period of time), verifying that a particular user account is not suspended or flagged, and/or verifying that a particular user account is permitted to access specific data, to name a few. The identity provider sub-system 106 may configure an IDP data packet payload with verification information and/or a current timestamp, and the sub-system 106 may sign the data packet using the identity provider private key. The identity provider sub-system 106 may transmit the signed IDP data packet to one or more other sub-systems.

Accordingly, the identity provider sub-system 106 may have a timestamp module 220 to determine the current time and/or provide a timestamp. The timestamp may be included in an IDP data packet, e.g., as part of a hashed payload. The timestamp may be used in a TOTP to generate and/or verify an authentication token. The timestamp may be used to verify that a user session has not expired and/or that a preexisting IDP data packet has not expired (e.g., exceeded a threshold period of time, such as 5 minutes, 10 minutes, 15 minutes, 30 minutes, 1 day, to name a few).

The data packet configuration module 222 may configure a data packet, e.g., by setting values of payload variables, appending data to a payload, and/or modifying data in a payload. For example, payload logic rules may require specific data elements in the payload, such as a current timestamp, a user ID, and/or a session ID, to name a few. The data packet configuration module may assemble the required elements and/or set the values of variables therefor (e.g., setting a timestamp associated with a timestamp data field) in order to configure the data packet.

The data packet generation module 224 may generate a data packet by hashing the configured data packet payload by applying a hash algorithm to the data payload. The hash algorithm may produce a unique payload based upon unique data, where a current timestamp combined with the other payload data helps enforce uniqueness within the system. Generating a data packet may comprise processing a data payload to transform it into a data packet that can be transmitted to other sub-systems and/or to external systems. In embodiments, the data packet generation module 224 may generate an HTTP cookie containing the configured payload data. In embodiments, configuring a data packet may comprise generating a data packet with the configured payload data.

The cryptography module 226 may digitally sign IDP data packets using the identity provider private key. For example, a data packet generated via an algorithmic hash of a configured data payload may be signed. Other sub-systems may verify the signature and/or read the data packet contents using a corresponding public key, but only the identity provider sub-system 106 can provide the signature. Accordingly, the other sub-systems may each verify an identity provider sub-system signature before further processing, e.g., in response to a user request. The cryptography module 226 itself may verify existing data packet signatures, including the signatures of other sub-systems using public keys corresponding to the respective sub-system private keys.

The login credential verification module 228 may verify login credentials received from a user device 102. The module 228 may compare a received username and password with a username and password stored in a credentials database. The module 228 may generate an electronic notification that credentials were verified or rejected. In embodiments, such a notification may be provided to a web server 104, which may provide corresponding display data to the user device 102 (e.g., providing access to data after credentials were verified or prompting the user to input different credentials after credentials were rejected). In embodiments, an IDP data packet will not be generated and/or signed without credential verification.

The multi-factor authentication module 230 may perform multi-factor authentication, such as generating an authentication token, providing a token to a user device, verifying an authentication token, and/or comparing biometric samples or images of a user, to name a few. In embodiments, such multi-factor authentication operations may be performed by an authenticator computer system 108. The multi-factor authentication module 230 may communicate with the authenticator computer system 108 to request multi-factor authentication of a particular user or user account and/or to receive authentication verification or rejection data from the authenticator computer system 108.

The data packet update module 232 may process electronic requests (e.g., received from other sub-systems) for an updated IDP data packet. Accordingly, the data packet update module 232 may cause an existing data packet to be updated with a current timestamp and a new identity provider sub-system signature. In embodiments, the data packet update module 232 may cause a new IDP data packet to be generated (e.g., by the data packet configuration module 222, generation module 224, and/or cryptography module 226) having a current timestamp. An updated IDP data packet may comprise updated payload data, in addition to the updated timestamp. For example, a first IDP data packet may include login credential verification data, while a second, updated IDP data packet may also include multi-factor authentication verification data.

Figure 2B:
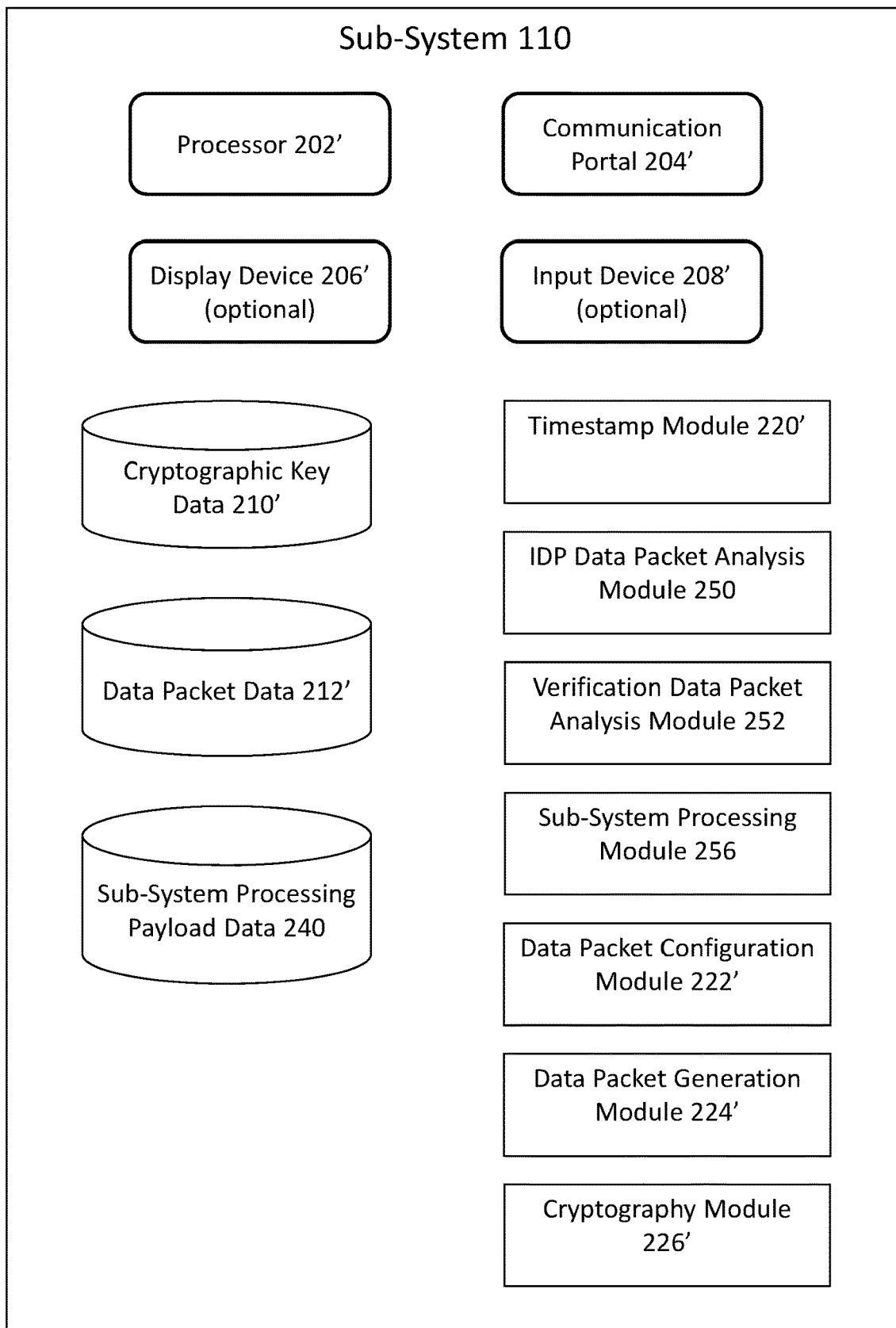
FIG. 2B is a schematic diagram of a distributed computing processing sub-system in accordance with exemplary embodiments of the present invention.

FIG. 2B is a schematic diagram of an exemplary sub-system 110, which may be a sub-system for performing system processes. The sub-system 110 may comprise one or more processors 202' and one or more communication portals 204', as described with respect to FIG. 1A. The sub-system 110 may also include one or more display device 206' and/or input device 208'. Sub-system 110 can include non-transitory computer-readable memory, which may comprise one or more database. Data stored in the memory can include cryptographic key data 210' and data packet data 212', as described with respect to FIG. 2A. Data can also include sub-system processing payload data 240. Sub-system 110 can comprise one or more software modules stored in the memory and running or configured to run on the one or more processors 202'. Such modules can include a time-stamp module 220', data packet configuration module 222', data packet generation module 224', and/or cryptography module 226', as described with respect to FIG. 2A. Modules can also include an IDP data packet analysis module 250, verification data packet analysis module 252, and/or sub-system processing module 256, to name a few. The functions described herein with respect to each module may be performed by one or more other modules (e.g., additional modules and/or consolidated with other modules described herein).

Sub-system processing payload data 240 may comprise data related to core processes performed by the sub-system, such as computations, verifications, transactions, electronic message generations, to name a few. Such data may be provided to one or more other sub-systems. In embodiments, such data may be provided to a web server 104 for formatting and/or transmission to a user device 102.

The sub-system processing module 256 may perform core sub-system processes. Such processes may be performed periodically, e.g., at predetermined times or intervals, continuously (e.g., active monitoring operations), and/or in response to events (e.g., triggering events and/or electronic requests received from user devices, the web server 104, and/or other sub-systems, to name a few).

The IDP data packet analysis module 250 may verify an identity provider sub-system signature, e.g., using a public key corresponding to the identity provider sub-system private key. Accordingly, the module 250 may confirm that a signature on an IDP data packet originated from the identity provider sub-system 106. In embodiments, such a verification may use the cryptography module 226'.

In embodiments, a sub-system may receive a verification data packet from one or more other sub-systems. The verification data packet, which may be signed by one or more sub-systems, may certify that the verification data packet payload and/or data received along with the verification data packet (e.g., in accompanying data packets) originated from a sub-system and not an unauthorized third party. Accordingly, the verification data packet may provide a mechanism for intra-system trust. A sub-system 110 may disregard data and/or electronic requests not accompanied by or contained within a verification data packet whose signature has been verified by the sub-system 110. In embodiments, each sub-system may generate its own verification data packet. In other embodiments, each sub-system may append data and/or a signature onto a single verification data packet.

The verification data packet analysis module 252 may verify one or more sub-system signatures on a verification data packet, e.g., using public keys corresponding to the private keys of the respective one or more sub-systems that signed the verification data packet. The verification data packet analysis module 252 may prevent execution of sub-system processes if the verification data packet is not verified by the sub-system 110.

The data packet configuration module 222' may configure a payload, e.g., for a verification data packet from the sub-system 110. The data packet generation module 224' may generate such a data packet, and the cryptography module 226' may be used to sign it using the private key of the sub-system 110.

FIGS. 3A-C, 4A-C, and 5 are schematic diagrams illustrating exemplary communications in the exemplary system for secure, authenticated distributed computing. Communications between system components or sub-systems may be described as transmissions or receipts with the understanding, for example, that a transmission from A to B can include a receipt at B from A. FIGS. 3A-C illustrate communications between a user device 102 and a web server 104 at various time intervals (e.g., $T_1$, $T_2$, $T_3$). Times are described with respect to time intervals because the illustrated communications are often asynchronous. Accordingly, the communications within a time interval may occur in a sequence and not at the same exact time. FIGS. 4A-C illustrate exemplary communications between a web server 104 and an identity provider sub-system 106 within the same time intervals depicted in FIGS. 3A-C (e.g., $T_1$, $T_2$, $T_3$). In embodiments, the communications of FIGS. 4A-C may comprise part of the same sequence as the communications within the corresponding time interval of FIGS. 3A-C. For example, an exemplary communication sequence may comprise step S302, followed by step S402, followed by step S404, and then step S304. FIG. 5 illustrates exemplary communications between a web server 104 and a sub-system 110, which may also occur within time interval $T_3$. For example, in embodiments, step S410 and step S502 may occur or be initiated at approximately the same time, e.g. within one second of each other. In embodiments, such a communication can occur at a later time, e.g., during time interval $T_4$.

Turning to FIG. 3A, time interval $T_1$ may be associated with login request processes, comprising a user device requesting access to data from a web server and receiving a response. Prior to time interval $T_1$, the web server may have provided display data to the user device associated with a user interface for submitting a login request. In the time interval $T_1$, at a step S302, a user device may transmit to a web server a user device electronic login request comprising login credentials (e.g., a username and/or password). Accordingly, the web server may receive the electronic login request. The login credentials may be transmitted as one or more data packets.

At a step S304, also within the time interval $T_1$, the web server may transmit and the user device may receive a first signed IDP data packet and first display data. In embodiments, the first signed IDP data packet and the first display data may be transmitted separately. In other embodiments, they may be transmitted together, such as via distinct data packets comprising a single data transmission. The first signed IDP data packet may comprise an HTTP cookie, which may have been generated by the web server based upon an IDP data packet received from the identity provider sub-system. The HTTP cookie may reside on the user device, e.g., associated with an Internet browser or with a mobile application. The first signed IDP data packet may comprise at least login credential verification information indicating that the system verified the login credentials received from the user device. In embodiments, the web server may encrypt the first signed IDP data packet (e.g., by applying an encryption algorithm) before transmitting it to the user device. The first display data may comprise data to generate a display and/or display a multi-factor authentication user interface (e.g., for inputting multi-factor authentication information).

Referring to FIG. 3B, a time interval $T_2$ may correspond to multi-factor authentication processes. In embodiments, multi-factor authentication may not be employed, and accordingly, the processes described with respect thereto may not be performed. In the time interval T2, at a step S306, a user device may transmit to a web server, which may receive, e.g., via a data network, user device multi-factor authentication data, which may comprise a multi-factor authentication data packet. Multi-factor authentication data can include an alphanumeric text sequence (e.g., transmitted to a second user device and input at the first user device for transmission to the web server). In embodiments, multi-factor authentication data can include an authentication token, which may be generated by a secret seed stored at the user device. In the step S306 the user device may also transmit to the web server the first signed IDP data packet. The first signed IDP data packet may have been stored at the user device following its receipt from the web server. The first signed IDP data packet may be used to indicate to the web server and/or other sub-systems that the user device credentials were verified and/or that a user session has not expired. In embodiments, the user device transmissions of step S306 may comprise separate transmissions. The web server may decrypt the first signed IDP data packet if it is encrypted.

At a step S308, also with the time interval $T_2$, the web server may transmit to the user device a second signed IDP data packet and second display data. The second signed IDP data packet and second display data may be transmitted separately or as part of the same transmission. The second signed IDP data packet may comprise at least authentication verification data indicating that multi-factor authentication was performed. It may be encrypted, e.g., by the web server prior to transmission. The second display data may comprise data to generate a display and/or display a user interface. Such a user interface may present information from the distributed computing system and/or electronic elements for user actions (e.g., user selections, user inputs, to name a few).

Referring to FIG. 3C, a time interval $T_3$ may correspond to system operations. Such system operations may be performed only after a user is authenticated, such as through login credentials and/or multi-factor authentication. In the time interval $T_3$, at a step S310, the user device may transmit to the web server a user data packet. Such a data packet may comprise data requiring processing by the computer system and/or an electronic request requiring processing. The user device may also transmit to the web server the second signed IDP data packet. The web server may decrypt the IDP data packet if it is encrypted. The second signed IDP data packet may indicate that the user has been fully authenticated, and the system can proceed with processing the received user data packet. In embodiments where only one level of user verification is required this may be a first signed IDP data packet.

At a step S312, also in time interval $T_3$ the web server may transmit to the user device a third signed IDP data packet and third display data. The third signed IDP data packet and third display data may be transmitted separately or together. The third signed IDP data packet may contain some of the same information as the preceding second signed IDP data packet (e.g., user ID, session ID, user authentication information, to name a few), but may also contain updated time information (e.g., an updated timestamp). The third signed IDP data packet may thus be used to ensure that a user session has not timed out (e.g., that a threshold period of time from a last user action was not exceeded). The third signed IDP data packet may be encrypted prior to transmission. The third display data may comprise a user interface containing information and/or user options in response to the user request. For example, if the user data packet comprised an electronic user request for a current account balance from a financial exchange computer system, the third display data may indicate the balance.

Turning to FIGS. 4A-C, communications processes related to the time intervals $T_1$, $T_2$, and $T_3$ are shown. In FIG. 4A in a time interval $T_1$, at a step S402, the web server may transmit a login credentials data packet to the identity provider sub-system. The login credential data packet may be the same as the user device electronic login request and/or may contain information from the user device electronic login request, such as a username and password.

Still in time interval $T_1$, at a step S404, the identity provider sub-system may transmit a first signed IDP data packet to the web server. As described with respect to FIG. 3A, the first signed IDP data packet may contain login credential verification information.

Referring to FIG. 4B, in the time interval $T_2$ and at a step S406, the web server may transmit to the identity provider sub-system a multi-factor authentication data packet, which is described with respect to FIG. 3B. The multi-factor authentication data packet may comprise an electronic request for multi-factor authentication and/or corresponding multi-factor authentication data (e.g., an authentication token). The web server may also transmit to the identity provider sub-system the first signed IDP data packet. The web server may transmit to the identity provider sub-system an electronic request for an updated IDP data packet. In embodiments, the web server may decrypt the existing IDP data packet before transmitting it to the identity provider sub-system. The web server and/or the identity provider sub-system may rely upon the first signed IDP data packet to determine whether a user session is active and/or whether multi-factor authentication can proceed.

Still in time interval $T_2$, at a step S408, the identity provider sub-system may transmit a second signed IDP data packet to the web server. The second signed IDP data packet may contain information related to multi-factor authentication that was successfully performed. The second signed IDP data packet may also comprise an updated timestamp.

Referring to FIG. 4C, in the time interval $T_3$, at a step S410, the web server may transmit to the identity provider sub-system an electronic request for an updated IDP data packet, which may be a third signed IDP data packet. As described with respect to FIG. 3C, an updated IDP data packet may contain an updated timestamp to maintain (e.g., prolong) the user session without expiration so long as user activity is detected (e.g., received by the web server). The web server may also transmit to the identity provider sub-system the second signed IDP data packet, which may contain the existing user session information and/or verification information. In embodiments, the second signed IDP data packet or data contained in its payload may be used to generate the updated IDP data packet.

Also in the time interval $T_3$, at a step S412, the identity provider sub-system may transmit a third signed IDP data packet to the web server. The third signed IDP data packet may be the updated IDP data packet comprising updated time information.

Turning to FIG. 5, communications between the web server and a sub-system are shown, following the authentication of a user. In the time interval $T_3$, at a step S502, the web server may transmit an electronic request for system processing to the sub-system. The web server may also transmit to the sub-system the second signed IDP data packet containing the existing authentication information. In embodiments, it may transmit the third signed IDP data packet following its receipt from the identity provider sub-system. In embodiments, a signed web server verification data packet may be transmitted to the sub-system. The signed web server verification data packet may certify that the processing request was an authorized request from the web server.

Still in the time interval T3, at a step S504, the sub-system may transmit a sub-system data packet to the web server. The sub-system data packet may contain the results of the sub-system processing. As described herein, a data packet transmission may actually comprise a plurality of data packets. The sub-system may also transmit to the web server a sub-system signed verification data packet. The sub-system signed verification data packet may indicate that the processing was performed by the sub-system. In embodiments, the signed sub-system verification data packet may comprise a modification of (e.g., by appending to) an existing sub-system verification data packet, such as the web server verification data packet, which can be passed among the sub-systems during their processing. In embodiments, verification data packets may be used for processing requiring data from or processes performed by multiple sub-systems and/or for processes where security is required or desired to prevent unauthorized access to data or unauthorized insertion of data into the system. In embodiments, verification data packets may not be used when communicating between other sub-systems and the web server.

Figure 6A:
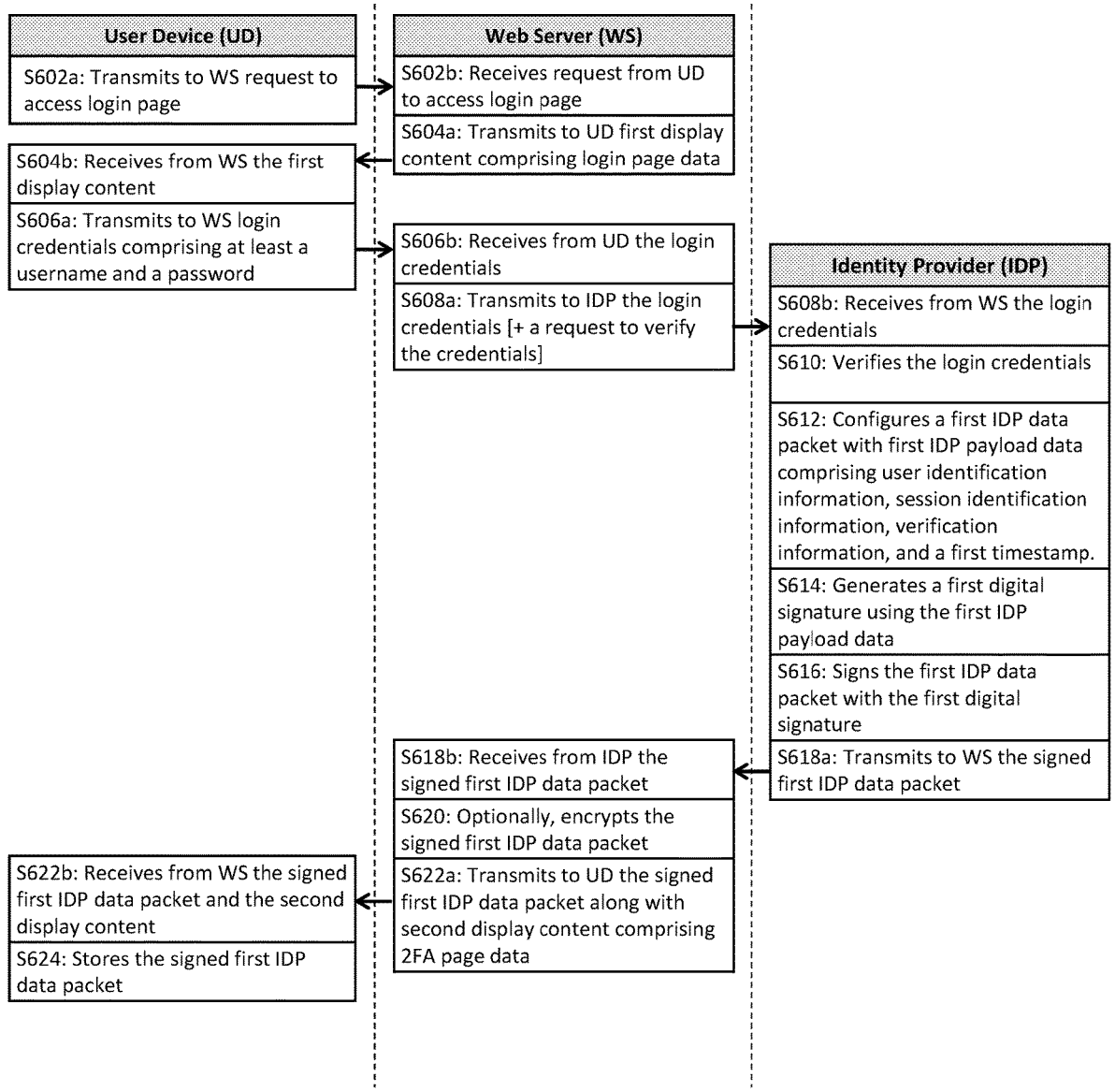
FIGS. 6A-C are flow charts of an exemplary process for user authentication in accordance with exemplary embodiments of the present invention.
Figure 6B:
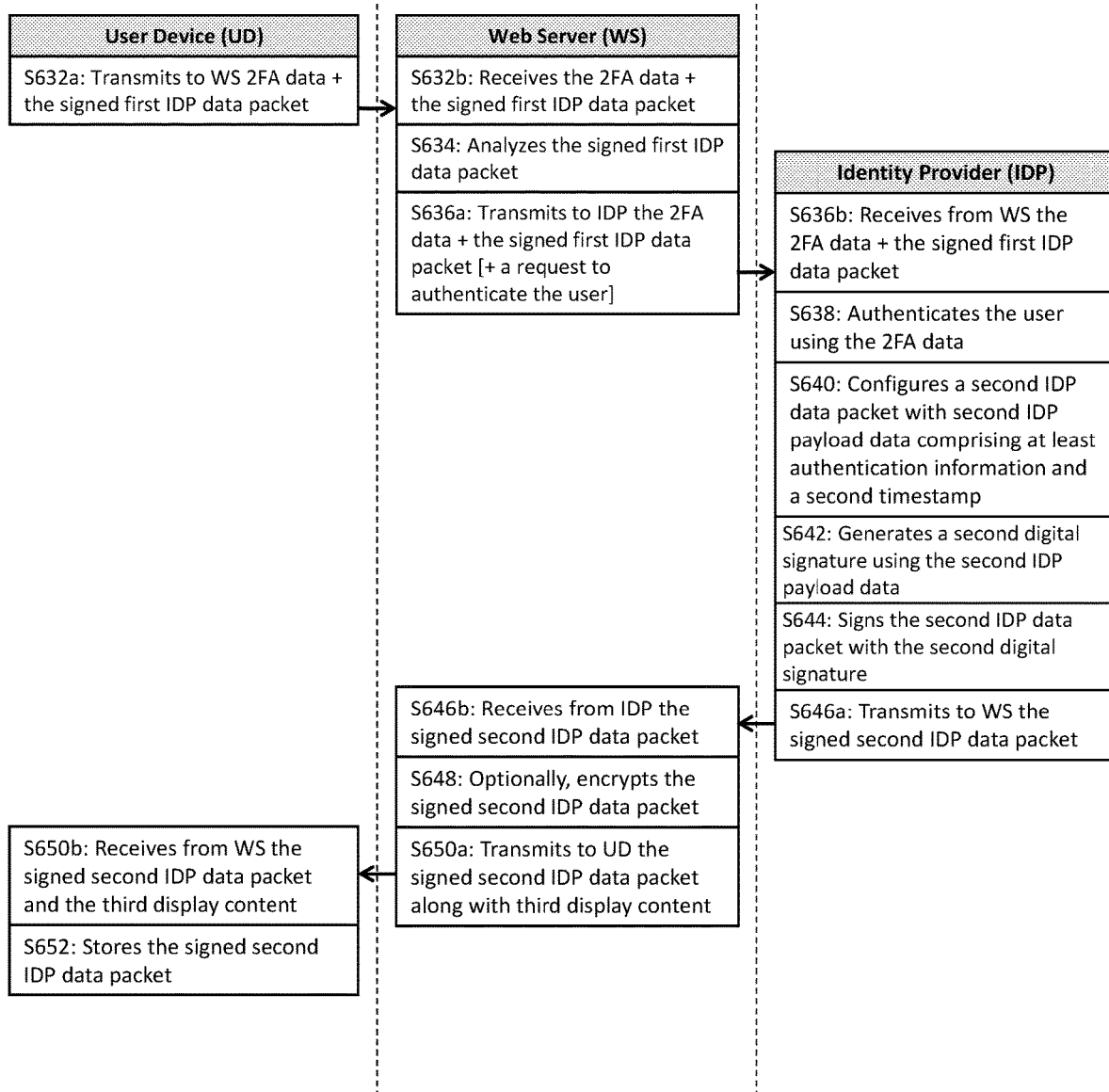
Figure 6C:
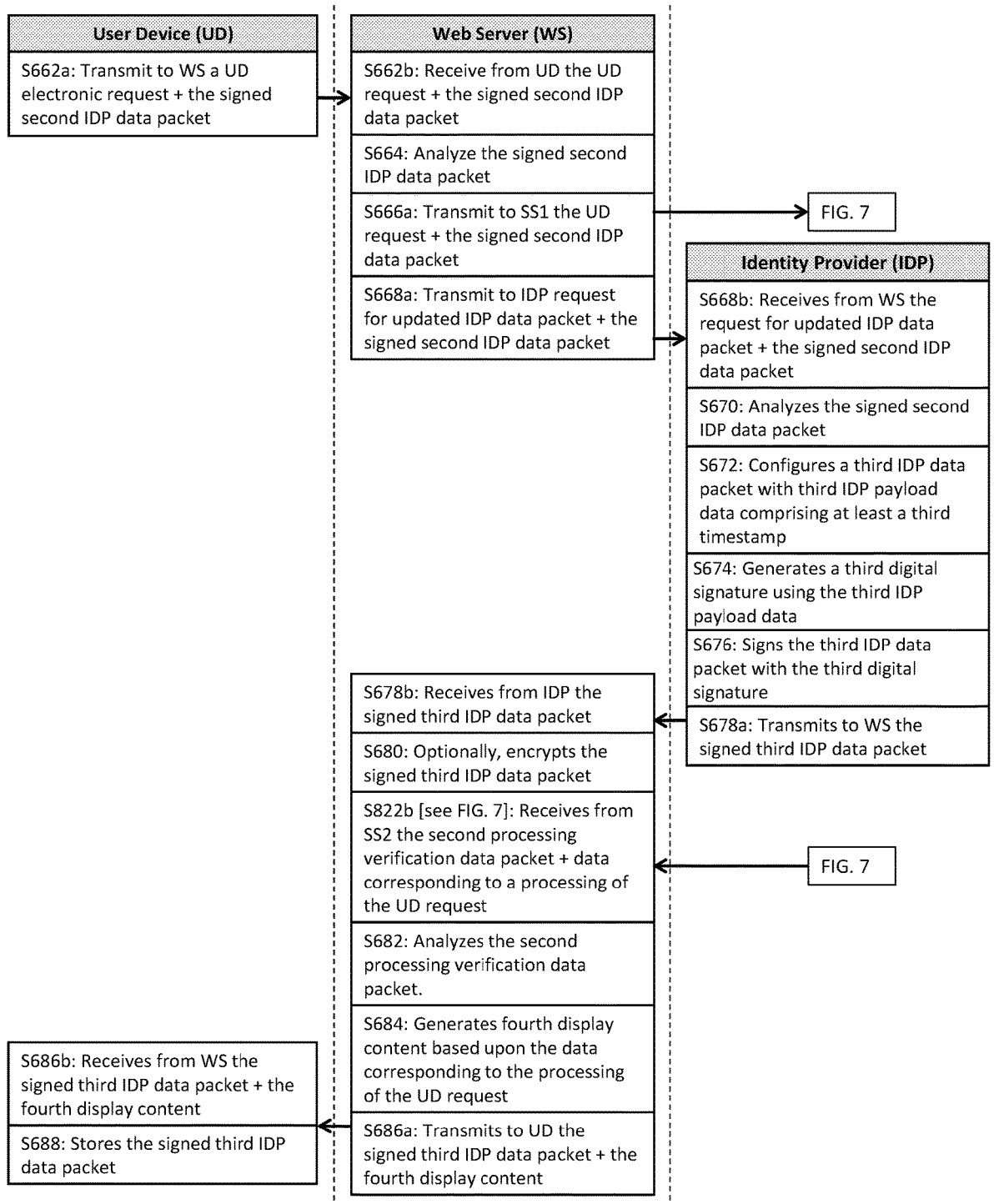

FIGS. 6A-C are flow charts of an exemplary process for user authentication in accordance with exemplary embodiments of the present invention. These processes entail generation and transmission of an IDP data packet to track user access authorization in a distributed computing system. A computing system is described with respect to a web server, which can provide user access to the computing system, an identity provider, which can perform processes to verify and/or certify user authorization, and one or more sub-systems that can perform computing processes associated with the functions of the computing system. For convenience, multi-factor authentication processes are described with respect to the identity provider, although such processes may be performed in whole or in part by one or more other sub-systems or external systems. One or more user device may access the computing system. Data transmitted to and/or among the system components may be transmitted via one or more data packets or via data streams. In embodiments, communications may be encrypted. In embodiments, only certain communications may be encrypted or communications between certain devices and/or system components, such as the web server and the user device. Accordingly, any transmission steps described herein may first entail encrypting the electronic message (e.g., the data packet), and any receipts of data may comprise decrypting the electronic message.

In a step S602a, a user device may transmit to the web server an electronic request to access a login page. In a step S602b, the web server may receive the electronic request. In embodiments, such a request may comprise navigating to a URL, selecting a login user interface element (e.g., an electronic login or sign in button), opening downloadable software (e.g., a mobile application running on a mobile user device, such as a smart phone or a tablet computer), and/or selecting a login option or content requiring a login (e.g., an electronic user interface element for performing a transaction or viewing user account data), to name a few.

In a step S604a, the web server may transmit to the user device first display content comprising login page data. In embodiments, display content may be a webpage, webpage content, machine-readable instructions for rendering a webpage (e.g., HTML and/or JavaScript computer code), application display content (e.g., for displaying content on a mobile application), and/or machine-readable instructions for rendering application display content, to name a few.

In a step S604b, the user device may receive the first display content from the web server. In embodiments, the user device may render or otherwise display the first display content. This may comprise showing a login form with user interface elements for inputting login credentials (e.g., a username text input box and/or a password text input box). In embodiments, login credentials may comprise or may be determined from user biometric information, such as a fingerprint input electronically (e.g., via a fingerprint scanner) or a voice sample, and/or from an image of the user (e.g., via a camera and/or using facial recognition software).

In a step S606a, the user device may transmit to the web server login credentials, which may comprise at least a username and a password. In embodiments, login credentials may also comprise biometric information, answers to security questions, and/or other user descriptive data (e.g., a physical or electronic address, such as an IP address, a current location, which may be determined automatically by the user device or the computing system, such as via triangulation or a sensor such as a global position system (GPS) device, and/or device type information, such as indicating a model or serial number of the user device, to name a few). In embodiments, login credential verification may be performed locally at the user device. In such a case the login credential verification data indicating the outcome of the verification (e.g., a successful verification) may be transmitted to the web server.

In a step S606b, the web server may receive from the user device the login credentials.

In a step S608a, the web server may transmit to the identity provider sub-system the login credentials. In embodiments, the web server may also transmit an electronic request to verify the login credentials.

In a step S608b, the identity provider sub-system may receive the login credentials and/or the accompanying electronic request for verification.

In a step S610, the identity provider sub-system may verify the login credentials. Credential verification may comprise comparing the received login credentials against a login credential database, which may be stored in non-transitory computer readable memory operatively connected to the computing system and/or one or more sub-systems thereof.

In a step S612, the identity provider sub-system may configure a first IDP data packet with first identity provider payload data. The payload data may comprise user identification information, session identification information, verification information (e.g., comprising the login credentials and/or a login credential verification status indicator to indicate whether the login credentials were successfully verified), and/or a first timestamp. Configuring the data packet may comprise generating information for one or more data fields (e.g., a timestamp data field), accessing information for the one or more data fields (e.g., from other sub-systems or from one or more databases), and/or setting values of the one or more data fields (e.g., creating and/or populating an electronic array or an object in working memory to organize and/or store the payload data).

In a step S614, the identity provider sub-system may generate a first digital signature. In embodiments, the signature may comprise an encryption using the identity provider sub-system private key. The identity provider sub-system may generate a hash of the payload data, e.g., by applying an algorithm that can generate a fixed-length output with a smaller size in computer-readable memory. The identity provider sub-system may use the hashed payload to generate the digital signature, such as by encrypting the payload with the private key. In embodiments, the digital signature may be based on the non-hashed payload, e.g., by encrypting the payload with the private key.

In a step S616, the identity provider sub-system may sign the first IDP data packet with the first digital signature. In embodiments, signing the data packet may comprise appending the generated digital signature to the data packet or otherwise inserting the digital signature into the data packet.

In a step S618a, the identity provider sub-system may transmit to the web server the signed first IDP data packet.

In a step S618b, the web server may receive from the identity provider sub-system the signed first IDP data packet.

In a step S620, the web server may encrypt the signed first IDP data packet, e.g., for secure transmission to the user device. In embodiments, the web server may encrypt any electronic messages, including display content, that will be transmitted, e.g., to a user device. Encryption may be optional. The web server may otherwise reformat or regenerate the data for delivery to the user device. For example, in embodiments the web server may generate an HTTP cookie based upon the signed first IDP data packet.

In a step S622a, the web server may transmit to the user device the first signed IDP data packet. The web server may also transmit second display data for displaying content at the user device, which may provide a user interface for inputting multi-factor authentication data, such as an authentication token or alphanumeric sequence. In embodiments, these transmissions may be bundled together in a single transmission of one or more data packets, or they may occur asynchronously.

In a step 622b, the user device may receive from the web server the signed first IDP data packet and the second display data. The user device may render an electronic display, such as showing a webpage or particular content on a mobile application, based upon the second display data.

In a step S624, the user device may store the signed first IDP data packet. The data packet may be stored in non-transitory computer-readable memory. In embodiments, it may be stored, e.g., by a web browser, as an HTTP cookie.

FIG. 6B shows additional steps in processes for providing secure user authentication in a distributed computing system.

In a step S632a, the user device may transmit to the web server multi-factor authentication data (e.g., an authentication token). The user device may also transmit the signed first IDP data packet, which it had stored locally.

In a step S632b, the web server may receive from the user device the multi-factor authentication data and the signed first IDP data packet.

In a step S634, the web server may analyze the signed first IDP data packet. The web server may verify the digital signature using a public key corresponding to the identity provider sub-system private key. The web server may analyze the payload data to determine whether the user device and/or its user are authorized to access the distributed computing system, before transactions therewith, and/or receive data therefrom. For example, the web server may analyze time information in the signed first IDP data packet by comparing the indicated time against a current time. The web server may then determine whether the elapsed time between the data packet timestamp and the current time exceeds a session duration threshold. Such a threshold may be stored in non-transitory computer-readable memory operatively connected to the distributed computing system, including the web server sub-system. The web server may also analyze the login credential information to determine whether a user's login credentials have already been verified. Verifying user authorization based upon the information in the signed first IDP data packet may be a prerequisite to further processing by the computing system.

In a step S636a, the web server may transmit to the identity provider sub-system the second authentication data. The web server may also transmit the signed first IDP data packet and/or any information contained therein. In embodiments, the web server may generate and transmit an electronic request for an updated IDP data packet. In embodiments, the web server may generate and transmit an electronic request to the identity provider sub-system for multi-factor authentication. In embodiments, the web server may transmit such a request and multi-factor authentication data to a multi-factor authentication sub-system or an external multi-factor authentication computer system.

In a step S636b, the identity provider sub-system may receive from the web server the multi-factor authentication data, the electronic request for multi-factor authentication, the signed first IDP data packet, and/or the electronic request for an updated IDP data packet.

In a step S638, the identity provider sub-system may authenticate the user using at least the multi-factor authentication data. Authenticating the user may comprise comparing the multi-factor authentication data (e.g., an authentication token, a biometric data sample, to name a few) to authentication reference data, which may be stored in non-transitory computer-readable memory operatively connected to the identity provider sub-system. In embodiments, the authentication operations may be performed by a different sub-system or an external computer system, and the authentication results may be transmitted to the identity provider sub-system.

In a step S640, the identity provider sub-system may configure a second IDP data packet with second IDP payload data. The second IDP payload data can include updated current time information. It can also include authentication verification information indicating the status of user authentication. Like the first IDP data payload data, the second IDP payload data may include user identification information and/or session identification information. In embodiments, the identity provider sub-system may generate a cookie, e.g., an HTTP cookie, containing the second IDP payload data.

In a step S642, the identity provider sub-system may generate a second digital signature using the identity provider sub-system private key. The digital signature may comprise an encryption of the second IDP payload data. In embodiments, the identity provider sub-system may generate a hash of the second IDP payload data, e.g., by applying a hash algorithm to the payload data. The identity provider sub-system may then generate the digital signature using the hashed payload data, such as by encrypting the hashed payload data.

In a step S644, the identity provider sub-system may sign the second IDP data packet with the second digital signature. In embodiments, the signature may be appended to or otherwise embedded in the data packet.

In a step S646a, the identity provider sub-system may transmit to the web server the signed second IDP data packet.

In a step S646b, the web server may receive from the identity provider sub-system the second IDP data packet. In embodiments, the web server may generate a cookie such as an HTTP cookie from the second IDP data packet.

In a step S648, the web server may encrypt the signed second IDP data packet, which may enable a secure transmission to the user device.

In a step S650a, the web server may transmit to the user device the signed second IDP data packet. The web server may also transmit third display content, which may correspond to access to the distributed computing system that was contingent on user authentication. These transmissions may be separate or together.

In a step S650b, the user device may receive from the web server the signed second IDP data packet and the third display content. The user device may decrypt any received encrypted transmissions. The user device may render the third display content on a display (e.g., a monitor and/or a touch screen).

In a step S652, the user device may store the second signed IDP data packet. If the data packet is a cookie, the user device may store the cookie, e.g., in local memory.

FIG. 6C illustrates additional steps and processes to establish and/or maintain secure user authentication in accordance with the present invention.

In a step S662a, the user device may transmit to the web server an electronic user request. The request may comprise a request for access to a particular portion of the distributed computing system, a transaction request, and/or a request for data, to name a few. The request may require processing by a sub-system of the distributed computing system. The user device may also transmit the signed second IDP data packet.

In a step S662b, the web server may receive from the user device the user electronic request and the signed second IDP data packet. The web server may decrypt any received encrypted messages, such as an encrypted signed second IDP data packet.

In a step S664, the web server may analyze the signed second IDP data packet. The web server may verify the digital signature on the data packet. The web server may verify that the user was previously fully authenticated (e.g., via login credentials and/or multi-factor authentication). The web server may also verify that a user session has not expired.

In a step S666a, the web server may analyze the user electronic request and determine how to route and/or route the request. Accordingly, the request may be relayed to a different sub-system SS1 for processing. In embodiments, the web server may generate an electronic processing request based upon the user request and transmit such processing request to the sub-system SS1. The web server may transmit the signed second IDP data packet along with the processing request. In embodiments, the IDP data packet that is passed among sub-system components, such as SS1 and SS2, may be a separate data packet from the data packet that is transmitted to and from the user device, but may contain some or all of the same information. In embodiments, it may be a copy of the IDP data packet received from the user device. In embodiments, the web server may generate and transmit a verification data packet to the sub-system SS1. The verification data packet may be signed by a private key of the web server to indicate the origin and/or authenticity of the verification data packet and/or accompanying data transmissions, such as electronic requests. Sub-system processing is described further herein with respect to FIG. 7.

In a step S668a, the web server may generate and transmit to the identity provider sub-system an electronic request for an updated IDP data packet. The web server may also transmit the signed second IDP data packet to the identity provider sub-system.

In a step S668b, the identity provider sub-system may receive from the web server the electronic request for an updated IDP data packet. The identity provider sub-system may also receive the signed second IDP data packet.

In a step S670, the identity provider sub-system may analyze the signed second IDP data packet. Analyzing the data packet may comprise verifying the digital signature and/or accessing information from the data packet payload. The identity provider sub-system may determine whether sufficient authorization (e.g., login credential verification and/or multi-factor authentication) was previously performed and/or whether a user session has not expired (e.g., by comparing time information in the data packet payload to current time information).

In a step S672, the identity provider sub-system may configure a third IDP data packet with third IDP payload data. The third payload data may comprise at least an updated current timestamp. The third payload data may also include the other data fields from the second IDP data packet, such as a session identifier, user or user account identifier, login credential verification information and/or multi-factor authentication verification information, to name a few.

In a step S674, the identity provider sub-system may generate a third digital signature using the third IDP payload data. The third digital signature may comprise an encrypted alphanumeric sequence generated using an encryption algorithm using the identity provider sub-system private key against the third IDP payload data or against a generated hash of the third IDP payload data.

In a step S676, the identity provider sub-system may sign the third IDP data packet with the third digital signature, e.g., by embedding the signature in the data packet.

In a step S678a, the identity provider sub-system may transmit to the web server the signed third IDP data packet.

In a step S678b, the web server may receive from the identity provider sub-system the signed third IDP data packet.

In a step S680, the web server may encrypt the signed third IDP data packet. In embodiments, the web server may convert the signed third IDP data packet into a cookie. In other embodiments, the identity provider sub-system may have generated and transmitted such a cookie to the web server.

In a step S822b, the web server may receive from a processing sub-system, e.g., sub-system SS2, a second verification data packet and/or data corresponding to a processing of the electronic user request. The processing of such a request by one or more processing sub-system and the use of verification data packets to provide authentication among the sub-systems is described herein with respect to FIG. 7.

In a step S682, the web server may analyze the received second processing verification data packet. For example, the web server may verify one or more digital signatures on the data packet corresponding to the one or more processing sub-systems that processed data for the data packet. Digital signatures may be verified by applying public keys corresponding to the private key that generated each sub-system signature. In embodiments, upon receipt of updated IDP data packets from the identity provider sub-system, the web server may also analyze such IDP data packets, e.g., to confirm the signature of the identity provider sub-system.

In a step S684, the web server may generate fourth display data based upon the data corresponding to the processing of the user request, which was received from a processing sub-system. In embodiments, display content is display data for generating a user interface (e.g., interface elements, information, electronic layout of the information, and/or behaviors bound to the interface elements, to name a few). Accordingly, the fourth display content may comprise display data for generating a user interface presenting information and/or options in response to the user request.

In a step S686a, the web server may transmit to the user device the signed third IDP data packet and the fourth display content.

In a step S686b, the user device may receive from the web server the signed third IDP data packet and the fourth display content. The user device may render a display using the fourth display content.

In a step S688, the user device may store the signed third IDP data packet, e.g., as a locally stored cookie.

Figure 7:
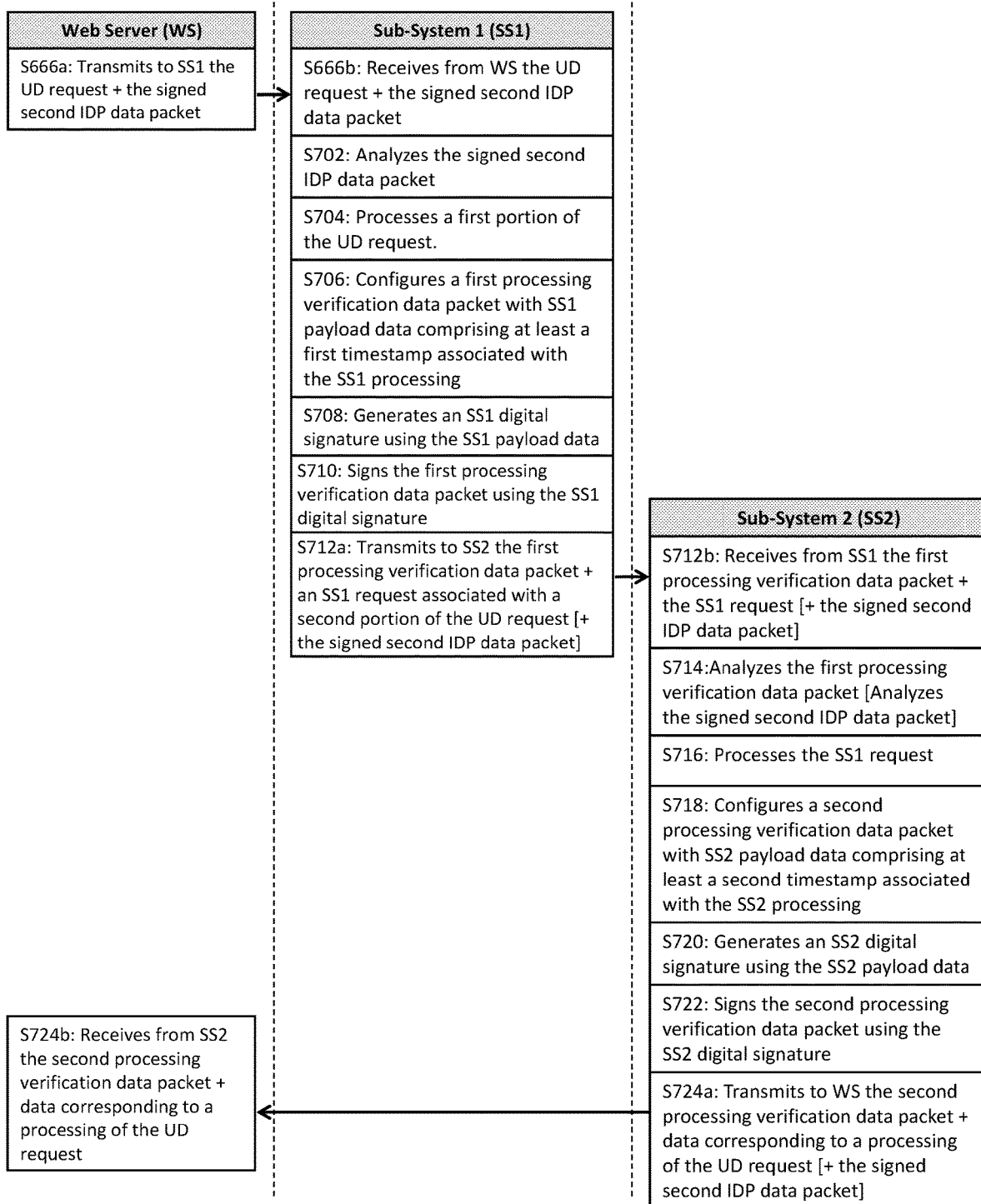
FIG. 7 is a flow chart of an exemplary process for secure system processing in accordance with exemplary embodiments of the present invention.

FIG. 7 is a flow chart of an exemplary process for secure system processing in accordance with exemplary embodiments of the present invention. FIG. 7 illustrates methods for a trust chain of sub-system verifications. In embodiments, the trust chain verification methods using one or more verification data packets, as described herein, may be performed for any processing performed by one or more sub-systems of the distributed computing system, particularly where processing by one sub-system is dependent on data or processes from a second sub-system. A user request may not be a precondition for such methods. In embodiments, automated monitoring processes or processes triggered by events (e.g., transactions performed, data received, data exceeding a threshold, to name a few) may comprise use of the sub-system verification techniques of the present invention.

As described with respect to FIG. 6C, in a step S666a, the web server may transmit to a first processing sub-system (SS1), the electronic user request and the signed second IDP data packet. In embodiments, instead of the user request the web server may transmit a processing request generated by the web server based at least in part upon the electronic user request.

In a step S666b, the first sub-system SS1 may receive from the web server the electronic processing request. The sub-system SS1 may also receive the signed second IDP data packet.

In a step S702, the first sub-system SS1 may analyze the signed second IDP data packet to verify that the request originated from an authorized user, e.g., by checking that the identity provider sub-system verified the user and/or that the user session has not expired. In embodiments, such IDP data packet analysis may have been performed by the web server or another processing sub-system, which may be indicated in a verification data packet received from the web server or from another processing sub-system, and the first sub-system SS1 may not be required to re-analyze the IDP data packet.

In a step S704, the first sub-system SS1 may process at least a first portion of the electronic request (e.g., the user request or a processing request received from a web server based upon the user request). Processing a portion of the request may comprise generating computer-readable instructions, executing such instructions or other instructions stored in memory and/or received by the sub-system, transmitting computer-readable instructions, transmitting electronic requests, fetching data, applying logical programming rules, computing one or more values, and/or comparing values to stored threshold values, to name a few.

In a step S706, the first sub-system SS1 may configure a first processing verification data packet with SS1 payload data. The SS1 payload data may comprise a first timestamp associated with the SS1 processing (e.g., associated with a time at which the SS1 payload is configured and/or a time a which processing by SS1 is completed). The SS1 payload data may comprise data output by the processing of the first sub-system SS1. The first sub-system SS1 may configure the first processing verification data packet automatically following the conclusion of the SS1 processing or in response to an electronic request, e.g., from another sub-system, for processed data.

In a step S708, the first sub-system SS1 may generate an SS1 digital signature. The digital signature may be based upon the SS1 payload data and/or a hash thereof. The first sub-system SS1 may generate the digital signature using its own SS1 private key.

In a step S710, the first sub-system SS1 may sign the first processing verification data packet using the generated SS1 digital signature.

In a step S712a, the first sub-system SS1 may transmit to a second processing sub-system SS2 the first processing verification data packet. In embodiments, the first sub-system SS1 may also generate and transmit an SS1 electronic request, which may be associated with processing a second portion of the initial electronic request (such as the user request or web server request). In embodiments, the first sub-system SS1 may also transmit to SS2 the signed second IDP data packet.

In a step S712b, the second sub-system SS2 may receive the first processing verification packet. It may also receive the SS1 electronic request. In embodiments, it may instead receive a processing request from the web server associated with a second portion of processing. The second sub-system SS2 may also receive from SS1 (or from the web server) the signed second IDP data packet.

In a step S714, the second sub-system SS2 may analyze the first processing verification data packet. Analyzing the verification data packet may comprise verifying the SS1 digital signature using a public key corresponding to the SS1 private key. The second sub-system SS2 may also compare a timestamp in the verification data packet against a current timestamp to ensure that the received data is current and/or responsive to an electronic request currently being processed by the system (e.g., to ensure that the verification data packet is not previously used and now expired). In embodiments, the second sub-system SS2 may also analyze the signed second IDP data packet, e.g., to verify that the user session is not expired and/or that the user is fully authenticated.

In a step S716, the second sub-system SS2 may process the received SS1 electronic request (or a web server request).

In a step S718, the second sub-system SS2 may configure a second processing verification data packet with SS2 payload data. In embodiments, such payload data may include some or all of the information and/or data fields (e.g., with updated values) as contained in the first processing verification data packet. In embodiments, the second processing verification payload data, and the associated data packet, may comprise updated first processing verification payload data, e.g., by appending the updated data to the first payload data and/or by modifying values of data fields, such as with a current timestamp and/or with output data associated with the processing by the second sub-system SS2.

In a step S720, the second sub-system SS2 may generate an SS2 digital signature. The digital signature may be based upon the SS2 payload data and/or a hash thereof. The signature may be generated using an SS2 private key.

In a step S722, the second sub-system SS2 may signed the second processing verification data packet using the generated SS2 digital signature.

In a step S724a, the second sub-system SS2 may transmit to the web server the second processing verification data packet and/or data corresponding to a processing of the electronic request. In embodiments, the verification data packet itself may contain such data from processing the request. In embodiments, the second sub-system SS2 may transmit to the web server the signed second IDP data packet. In embodiments, the verification data packets may ensure a chain of processing by authenticated sub-systems occurred. In embodiments, verification data packets may not be transmitted to the web server and may only be used among processing sub-systems. In other embodiments, each processing sub-system may transmit its own verification data packet to the web server or to other sub-systems requiring data from the sub-system that performed a portion of processing. In embodiments, a single verification data packet may be transmitted among sub-systems and modified by each sub-system that processes a portion of the electronic request that requires authentication.

In a step S724b, the web server may receive from the second sub-system SS2 the second processing verification data packet and/or data corresponding to the processing of the electronic request (e.g., the user request). In embodiments, the web server may receive such processing data and/or verification data packets from each sub-system that performed processing. In embodiments, the web server may receive a single data packet comprising a chain of processing and verification information (e.g., output data from multiple sub-systems and corresponding digital signatures from each sub-system).

Accordingly, a method of authenticating a user and/or a user session may comprise receiving, at a web server of a computing system from a user device, an electronic login request comprising user credentials; transmitting, from the web server to an identity provider sub-system of the computing system, the user credentials for verification based at least in part upon reference user credentials stored in non-transitory computer-readable memory, wherein the identity provider is configured to authenticate user sessions; receiving, at the web server from the identity provider sub-system, a first signed identity provider data packet having a first payload comprising first login credential verification information, a first timestamp, a session identifier, and a first identity provider sub-system digital signature, wherein the first signed identity provider data packet provides an indication that the user session is authenticated and wherein the first identity provider sub-system digital signature is generated by generating a hash of the first payload and encrypting the hash using a first identity provider sub-system private key; generating, by the web server, first display data; transmitting, from the web server to the user device, the first signed identity provider data packet; and transmitting, from the web server to the user device, the first display data.

The method may further comprise receiving, at the web server from the user device, the first signed identity provider data packet; receiving, at the web server from the user device, a user data packet requiring processing by the computing system; transmitting, from the web server to a processing sub-system of the computing system, an electronic request for processing based at least in part upon the user data packet; transmitting, from the web server to a processing sub-system, the first signed identity provider data packet so that the processing sub-system can verify that the user session is authenticated; receiving, at the web server from the processing sub-system, first processed data; transmitting, from the web server to the identity provider sub-system, the first signed identity provider data packet along with an electronic request to update the first signed identity provider data packet; receiving, at the web server from the identity provider sub-system, a second signed identity provider data packet having a second payload comprising the first login credential verification information, a second timestamp, the session identifier, and a second identity provider sub-system digital signature, wherein the second signed identity provider data packet provides an updated indication that the user session remains authenticated and wherein the second identity provider sub-system digital signature is generated by generating a hash of the second payload and encrypting the hash using the first identity provider sub-system private key; generating, by the web server, second display data based at least in part upon the first processed data; transmitting, from the web server to the user device, the second signed identity provider data packet; and transmitting, from the web server to the user device, the second display data.

In embodiments, the first signed identity provider data packet may be an HTTP cookie. In embodiments, the first signed identity provider data packet may encrypted prior to transmission to the user device and/or may be transmitted via an encrypted communication.

In embodiments, the method may further comprise, after receiving the first signed identity provider data packet, the step of verifying, by the web server, the authenticity of the first signed identity provider data packet by decrypting the first signed identity provider data packet using a public key corresponding via asymmetric key cryptography to the identity provider sub-system private key.

In embodiments, the first signed identity provider data packet may be used by the processing sub-system to verify that the user session is authenticated by determining that the user credentials were authenticated and determining, based at least in part upon the first timestamp, that the user session has not timed out.

In embodiments, the first display may data comprise machine-readable instructions to render a graphical user interface for inputting user multi-factor authentication data. In embodiments, the method may further comprise, e.g., prior to receiving a user data packet requiring processing by the computing system, the steps of receiving, at the web server from the user device, user multi-factor authentication data and the first signed identity provider data packet; transmitting, from the web server to the identity provider sub-system, the user multi-factor authentication data; receiving, at the web server from the identity provider sub-system, a third signed identity provider data packet comprising second login credential verification information including multi-factor authentication information, a third timestamp, the session identifier, and a third identity provider sub-system digital signature; generating, by the web server, third display data; transmitting, from the web server to the user device, the third signed identity provider data packet; and transmitting, from the web server to the user device, the third display data.

In embodiments, a method of authenticated computing may comprise receiving, at a first sub-system of a computing system from an origination sub-system, at least a first portion of a first electronic processing request; executing, by the first sub-system, first computing operations to satisfy the first portion of the first electronic processing request to generate a first sub-processing output; configuring, by the first sub-system, a first processing verification data packet comprising a first payload comprising a first timestamp and the first sub-processing output; generating, by the first sub-system, a signed first processing verification data packet by generating a hash of the first payload and encrypting the hash using a first sub-system private key; generating, by the first sub-system, a second electronic processing request associated with a second portion of the first electronic processing request; and transmitting, from the first sub-system to a second sub-system of the computing system, the second electronic processing request along with the signed first processing verification data packet.

The method may further comprise verifying, by the second sub-system, the authenticity of the signed first processing verification data packet by decrypting the signed first processing verification data packet using a public key corresponding via asymmetric key cryptography to the first sub-system private key; executing, by the second sub-system, second computing operations to satisfy the second electronic processing request to generate a second sub-processing output; configuring, by the second sub-system, a second processing verification data packet comprising a second payload comprising a second timestamp, the first sub-processing output, and the second sub-processing output; generating, by the second sub-system, a signed second processing verification data packet by generating a hash of the second payload and encrypting the hash using a second sub-system private key; and transmitting, from the second sub-system to a third sub-system of the computing system, the signed second processing verification data packet.

In embodiments, the origination sub-system may be a web server. In embodiments, the third sub-system may be the origination sub-system.

In embodiments, receiving at least a first portion of a first electronic processing request may further comprise receiving a first signed identity provider data packet, digitally signed using an identify provider private key by an identity provider sub-system that authenticated the user session. In embodiments, the method may further comprise verifying, by the first sub-system, the authenticity of the first signed identity provider data packet by decrypting the first signed identity provider data packet using a public key corresponding via asymmetric key cryptography to the identity provider private key.

In embodiments, the signed second processing verification data packet may comprise respective digital signatures of the first sub-system and the second sub-system. In embodiments, digital signatures from a plurality of sub-systems that processed some of the data in a data packet payload may be appended to that data packet. In embodiments, digital signatures may comprise alphanumeric sequences generated using a respective private key.

In embodiments, a computing system may comprise a web server comprising one or more computers; an identity provider sub-system; and non-transitory computer-readable memory comprising one or more memory devices operatively connected to the web server and to the identity provider sub-system, wherein the system is programmed to authenticate users by: receiving, at a web server of the computing system from a user device, an electronic login request comprising user credentials; transmitting, from the web server to an identity provider sub-system of the computing system, the user credentials for verification based at least in part upon reference user credentials stored in non-transitory computer-readable memory, wherein the identity provider is configured to authenticate user sessions; receiving, at the web server from the identity provider sub-system, a first signed identity provider data packet having a first payload comprising first login credential verification information, a first timestamp, a session identifier, and a first identity provider sub-system digital signature, wherein the first signed identity provider data packet provides an indication that the user session is authenticated and wherein the first identity provider sub-system digital signature is generated by generating a hash of the first payload and encrypting the hash using a first identity provider sub-system private key; generating, by the web server, first display data; transmitting, from the web server to the user device, the first signed identity provider data packet; and transmitting, from the web server to the user device, the first display data.

The system may further be programmed to perform the steps of receiving, at the web server from the user device, the first signed identity provider data packet; receiving, at the web server from the user device, a user data packet requiring processing by the computing system; transmitting, from the web server to a processing sub-system of the computing system, an electronic request for processing based at least in part upon the user data packet; transmitting, from the web server to a processing sub-system, the first signed identity provider data packet so that the processing sub-system can verify that the user session is authenticated; receiving, at the web server from the processing sub-system, first processed data; transmitting, from the web server to the identity provider sub-system, the first signed identity provider data packet along with an electronic request to update the first signed identity provider data packet; receiving, at the web server from the identity provider sub-system, a second signed identity provider data packet having a second payload comprising the first login credential verification information, a second timestamp, the session identifier, and a second identity provider sub-system digital signature, wherein the second signed identity provider data packet provides an updated indication that the user session remains authenticated and wherein the second identity provider sub-system digital signature is generated by generating a hash of the second payload and encrypting the hash using the first identity provider sub-system private key; generating, by the web server, second display data based at least in part upon the first processed data; transmitting, from the web server to the user device, the second signed identity provider data packet; and transmitting, from the web server to the user device, the second display data.

In embodiments, a computing system may comprise one or more processors and non-transitory computer-readable memory having stored thereon instructions to perform the steps of receiving, at a first sub-system of the computing system from an origination sub-system, at least a first portion of a first electronic processing request; executing, by the first sub-system, first computing operations to satisfy the first portion of the first electronic processing request to generate a first sub-processing output; configuring, by the first sub-system, a first processing verification data packet comprising a first payload comprising a first timestamp and the first sub-processing output; generating, by the first sub-system, a signed first processing verification data packet by generating a hash of the first payload and encrypting the hash using a first sub-system private key; generating, by the first sub-system, a second electronic processing request associated with a second portion of the first electronic processing request; and transmitting, from the first sub-system to a second sub-system of the computing system, the second electronic processing request along with the signed first processing verification data packet.

The computer-readable memory may further have stored thereon instructions to perform the steps of verifying, by the second sub-system, the authenticity of the signed first processing verification data packet by decrypting the signed first processing verification data packet using a public key corresponding via asymmetric key cryptography to the first sub-system private key; executing, by the second sub-system, second computing operations to satisfy the second electronic processing request to generate a second sub-processing output; configuring, by the second sub-system, a second processing verification data packet comprising a second payload comprising a second timestamp, the first sub-processing output, and the second sub-processing output; generating, by the second sub-system, a signed second processing verification data packet by generating a hash of the second payload and encrypting the hash using a second sub-system private key; and transmitting, from the second sub-system to a third sub-system of the computing system, the signed second processing verification data packet.

In embodiments, program products may be provided to facilitate the secure authentication operations of the present invention. Accordingly, software and/or software libraries, may be provided for implementation in computing systems, such as distributed computing systems, to perform the processes described herein.

Figure 8A:
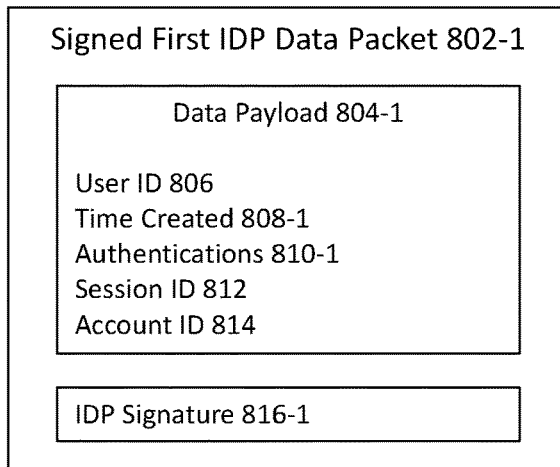
FIGS. 8A-C are schematic diagrams of an exemplary identity provider data packets in accordance with exemplary embodiments of the present invention.
Figure 8B:
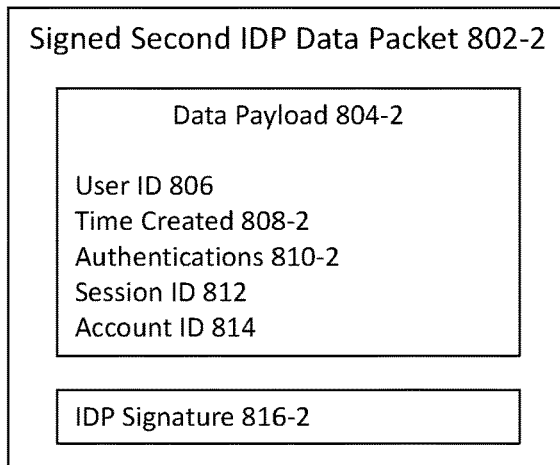
Figure 8C:
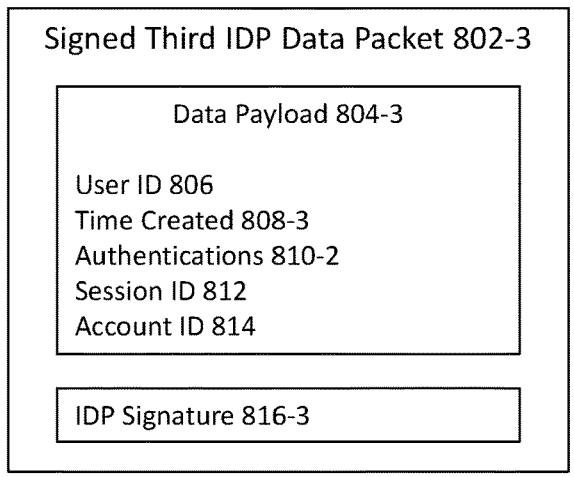

FIGS. 8A-C are schematic diagrams of an exemplary identity provider data packets in accordance with exemplary embodiments of the present invention.

FIG. 8A shows an exemplary signed first IDP data packet 802-1. The data packet may comprise a first data payload 804-1 and a first IDP digital signature 816-1, which may be based upon the payload data. The first data payload 804-1 can include a user identifier 806, an account identifier 814, and/or a session identifier 812. The first data payload 804-1 may also include time information 808-1 (e.g., a date and time corresponding to the time at which the data payload was configured) and authentication information 810-1, which may indicate the status of user authentication, such as that login credentials have been successfully verified. For example, authentication information 810-1 may indicate the date and time of last password entry and/or the result of a login credential verification process. Data fields for the date and time of last multi-factor authentication may be null or empty, as multi-factor authentication may not yet have occurred.

FIG. 8B shows an exemplary signed second IDP data packet 802-2, which may comprise a second data payload 804-2 and a corresponding second IDP signature 816-2. The second data payload 804-2 may include the same data fields as the first data payload 804-1, except with one or more updated values. For example, the time information 808-2 may be updated. The authentication information 810-2 may also be updated, for example, to include a date and time of last multi-factor authentication credentials received from a user device, a date and time of verification of multi-factor credentials, and/or the status of such verification.

FIG. 8C shows an exemplary signed third IDP data packet 802-3, which may comprise a third data payload 804-3 and a corresponding third IDP signature 816-3. The third data payload 804-3 may include the same data fields as the first or second data payloads, except with one or more updated values. For example, the time information 808-3 may be updated with current time information (e.g., date and time) to indicate that user activity has prolonged the user session duration.

FIGS. 9A-B are schematic diagrams of an exemplary processing verification data packets in accordance with exemplary embodiments of the present invention. FIG. 9A shows an exemplary signed first processing verification data packet 902. The data packet 902 may comprise a first data payload 904 and a sub-system 1 digital signature 906. FIG. 9B shows an exemplary signed second processing verification data packet 912. The data packet 912 may comprise a second data payload 914 and a sub-system 2 digital signature 916. The processing verification data packets of FIGS. 9A and 9B illustrate that each sub-system may generate its own verification data packet. In embodiments, however, a single verification data packet may be transmitted throughout a distributed computing system and modified by sub-systems as they perform processes requiring verification by the other sub-systems (e.g., as dictated by logical rules programmed and stored in non-transitory computer-readable memory). Accordingly, FIG. 9C shows an embodiments of the signed second processing verification data packet 922, which comprises the second data payload 914 and multiple signatures corresponding to the sub-systems that processed data for the data payload. The verification data packet thus includes both a sub-system 1 digital signature 906 and a sub-system 2 digital signature 916.

FIGS. 10A-F are schematic diagrams of an exemplary processing verification data payloads in accordance with exemplary embodiments of the present invention related to a distributed computing system for a digital asset exchange. Exemplary data fields in the data payloads are illustrated. The data fields may be populated and/or updated by one or more processing sub-system of the distributed computing system.

FIG. 10A shows an exemplary processing verification data payload 1002 corresponding to a ledger hold. A ledger hold may be instituted when a transaction has been requested by a user and is pending execution and/or confirmation. This may ensure that funds to perform the transaction are not double spent. Such a verification data payload may include a ledger hold identifier 1004, an account identifier 1006, and amount to hold 1008, a reason for the hold 1010, and/or a parent hold 1012, which may correspond to a parent account, e.g., an institutional trading account that has multiple sub-accounts.

FIG. 10B shows an exemplary processing verification data payload 1022 corresponding to an allowance of a withdrawal of funds. The payload may include an account identifier 1024 and an amount 1026, which may be the amount approved for withdrawal. Such an amount may be expressed in fiat currencies and/or in digital asset quantities.

FIG. 10C shows an exemplary processing verification data payload 1032 corresponding to a withdrawal of fiat currency. The payload may include an account identifier 1034, amount withdrawn 1036, and/or bank account identifier 1038 (e.g., to which the funds were transferred), to name a few.

FIG. 10D shows an exemplary processing verification data payload 1042 corresponding to a withdrawal of digital assets. The payload may include an account identifier 1044, amount withdrawn 1046, and/or digital asset address 1048 (e.g., to which the digital assets were transmitted), to name a few.

FIG. 10E shows an exemplary processing verification data payload 1052 corresponding to a deposit of fiat currency. The payload may include an account identifier 1054 and/or an amount deposited 1056.

FIG. 10F shows an exemplary processing verification data payload 1062 corresponding to a deposit of digital assets. The payload may include an account identifier 1064 and/or an amount deposited 1066.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A method comprising:
receiving, at a first subsystem and from a user device associated with a user, an electronic login request comprising login credential data;
verifying, by the first subsystem, that the login credential data is valid login credential data;
based at least in part on the login credential data being verified, generating, at the first subsystem:
a first payload comprising login credential verification information and a first session identifier; and
a first digital signature of the first subsystem comprising a first hash of the first payload, the first hash being encrypted using a first private key;
transmitting, from the first subsystem and to the user device, the first payload and the first digital signature;
receiving, from the user device and at the first subsystem:
a second payload comprising the first session identifier and a first one-time token generated by the user device; and
a second digital signature comprising a second hash of the second payload;
verifying the second payload; and
based at least in part on the second payload being verified, authorizing the user device to communicate with a second subsystem.

2. The method of claim 1, wherein:
the electronic login request is received by a web server operatively connected to the first subsystem; and
the web server is operatively connected to the second subsystem.

3. The method of claim 1, wherein the first payload and the first digital signature are communicated by the first subsystem to the user device via a web server where the electronic login request was received.

4. The method of claim 1, wherein the first one-time token is received from the user device and is generated by the user device using a shared secret seed associated with the first subsystem.

5. The method of claim 1, wherein authorizing the user device to communicate with the second subsystem comprises authorizing the user device to communicate with the second subsystem via the first subsystem.

6. The method of claim 1, wherein:
the first subsystem is an identity provider subsystem configured to authenticate user identity; and
the second subsystem is a server subsystem configured to perform an action associated with cryptocurrency as requested by the user device.

7. The method of claim 1, further comprising:
receiving, from the user device, a request to send data to the second subsystem; and
sending, based at least in part on authorizing the user device to communicate with the second subsystem, the data to the second subsystem.

8. A system comprising:
one or more processors; and
non-transitory computer-readable media storing instructions that, when executed by the one or more processors, cause the one or more processors to perform operations comprising:
receiving, at a first subsystem and from a user device associated with a user, an electronic login request comprising login credential data;
verifying, by the first subsystem, that the login credential data is valid login credential data;
based at least in part on the login credential data being verified, generating, at the first subsystem:
a first payload comprising login credential verification information and a first session identifier; and
a first digital signature of the first subsystem comprising a first hash of the first payload, the first hash being encrypted using a first private key;
transmitting, from the first subsystem and to the user device, the first payload and the first digital signature;
receiving, from the user device and at the first subsystem:
a second payload comprising the first session identifier and a first one-time token generated by the user device; and
a second digital signature comprising a second hash of the second payload;
verifying the second payload; and
based at least in part on the second payload being verified, authorizing the user device to communicate with a second subsystem.

9. The system of claim 8, wherein:
the electronic login request is received by a web server operatively connected to the first subsystem;
the web server is associated with a first internet protocol address;
the web server is operatively connected to the second subsystem; and
the second subsystem is associated with a second internet protocol address.

10. The system of claim 8, wherein the first payload and the first digital signature are communicated by the first subsystem to the user device via a web server where the electronic login request was received.

11. The system of claim 8, wherein the first one-time token is received from the user device and is generated by the user device using a shared secret seed associated with the first subsystem.

12. The system of claim 8, wherein authorizing the user device to communicate with the second subsystem comprises authorizing the user device to communicate with the second subsystem via the first subsystem.

13. The system of claim 8, wherein:
the first subsystem is an identity provider subsystem configured to authenticate user identity; and
the second subsystem is a server subsystem configured to perform an action requested by the user device.

14. The system of claim 8, the operations further comprising:
receiving, from the user device, a request to send data to the second subsystem; and
sending, based at least in part on authorizing the user device to communicate with the second subsystem, the data to the second subsystem.

15. A system comprising:

one or more processors; and non-transitory computer-readable media storing instructions that, when executed by the one or more processors, cause the one or more processors to perform operations comprising:

verifying, by a first subsystem, that login credential data provided by a user device is valid login credential data;

based at least in part on the login credential data being verified, generating, at the first subsystem:

a first payload comprising login credential verification information and a first session identifier; and a first digital signature of the first subsystem comprising a first hash of the first payload;

transmitting, from the first subsystem and to the user device, the first payload and the first digital signature;

receiving, from the user device and at the first subsystem:

a second payload comprising the first session identifier and a first one-time token generated by the user device; and a second digital signature comprising a second hash of the second payload;

verifying the second payload; and based at least in part on the second payload being verified, authorizing the user device to communicate with a second subsystem.

16. The system of claim 15, the operations further comprising:

receiving, at the first subsystem and from the user device, an electronic login request comprising the login credential data; and wherein verifying the login credential data is based at least in part on receiving the electronic login request from the user device.

17. The system of claim 15, wherein:

the first hash is encrypted using a first private key associated with the first subsystem; and verifying the second payload is based at least in part on the first one-time token being generated in association with the first private key.

18. The system of claim 15, wherein verifying the second payload is based at least in part on the second payload and the second digital signature.

19. The system of claim 15, the operations further comprising:

receiving, from the user device, a request to send data to the second subsystem; and sending, based at least in part on authorizing the user device to communicate with the second subsystem, the data to the second subsystem.

20. The system of claim 15, wherein the first one-time token is received from the user device and is generated by the user device using a shared secret seed associated with the first subsystem.

\* \* \* \* \*